(12) United States Patent
Jang et al.

(10) Patent No.: US 11,606,026 B2
(45) Date of Patent: Mar. 14, 2023

(54) DISPLAY APPARATUS AND ELECTRONIC APPARATUS

(71) Applicants: Samsung Electronics Co., Ltd., Suwon-si (KR); Kookmin University Industry Academy Cooperation Foundation, Seoul (KR)

(72) Inventors: Duhee Jang, Suwon-si (KR); Sangkyoo Han, Seoul (KR); Jeongil Kang, Suwon-si (KR); Kasan Ha, Suwon-si (KR); Sanghoon Lee, Suwon-si (KR)

(73) Assignees: SAMSUNG ELECTRONICS CO., LTD., Suwon-si (KR); Kookmin University Industry Academy Corporation Foundation, Seoul (KR)

( * ) Notice: Subject to any disclaimer, the term of this patent is extended or adjusted under 35 U.S.C. 154(b) by 265 days.

(21) Appl. No.: 16/997,475

(22) Filed: Aug. 19, 2020

(65) Prior Publication Data
US 2021/0057989 A1 Feb. 25, 2021

(30) Foreign Application Priority Data
Aug. 20, 2019 (KR) .......... 10-2019-0102001

(51) Int. Cl.
*H02M 1/42* (2007.01)
*H04N 5/63* (2006.01)
*H02M 1/08* (2006.01)
*H02M 3/00* (2006.01)
*H02M 3/335* (2006.01)
*H02M 1/44* (2007.01)

(52) U.S. Cl.
CPC .......... *H02M 1/4258* (2013.01); *H02M 1/08* (2013.01); *H02M 1/4225* (2013.01); *H02M 3/01* (2021.05); *H02M 3/33571* (2021.05); *H02M 3/33573* (2021.05); *H04N 5/63* (2013.01); *H02M 1/44* (2013.01)

(58) Field of Classification Search
None
See application file for complete search history.

(56) References Cited

U.S. PATENT DOCUMENTS

2016/0365797 A1* 12/2016 Wu .................... H02M 1/4258

* cited by examiner

*Primary Examiner* — Samira Monshi
(74) *Attorney, Agent, or Firm* — Staas & Halsey LLP

(57) ABSTRACT

Disclosed are a display apparatus and an electronic apparatus, the display apparatus including: a main body including a display and a connector; and an adapter connectable to the main body and configured to supply power to the connected main body, the adapter including: a transformer configured to boost an input first alternating current (AC) voltage, a switch including a switching device configured to switch a current flowing in the transformer, a controller configured to control the switching device to output a second AC voltage boosted by the transformer, and the main body including a power factor correction (PFC) converter configured to correct a power factor of the second AC voltage output from the adapter and output a direct current (DC) voltage.

18 Claims, 24 Drawing Sheets

HIGH VOLTAGE MODE

LOW VOLTAGE PWM MODE
(DUTY CONTROL)

LOW VOLTAGE PWM MODE
(PHASE SHIFT)

LOW VOLTAGE PFM MODE

DISPLAY APPARATUS AND ELECTRONIC APPARATUS

CROSS-REFERENCE TO RELATED THE APPLICATION

This application is based on and claims priority under 35 U.S.C. § 119 to Korean Patent Application No. 10-2019-0102001 filed on Aug. 20, 2019 in the Korean Intellectual Property Office, the disclosure of which is incorporated by reference herein in its entirety.

BACKGROUND

Field

The disclosure relates to a display apparatus and an electronic apparatus, and more particularly to a display apparatus and an electronic apparatus which can receive power through a high voltage transformer.

Description of the Related Art

A power circuit of a television (TV) and the like display apparatus displays needs to be designed to form electric insulation between an input and an output and satisfy power factor and higher harmonics regulations to thereby supply highly stable and reliable power.

To meet such conditions, the display apparatus may include the power circuit that includes an uninsulated power factor corrector (PFC) satisfying the power factor and higher harmonics regulations, and a high-frequency insulated direct current (DC)/DC converter electrically insulated from a DC voltage output from the PFC and adjusting the DC voltage into a DC voltage having a level required by a load.

However, such a power circuit has problems that the circuit is complicated and there are limits to size reduction and weight lightening of an adapter because of a dual structure of the PFC and the insulated DC/DC converter.

SUMMARY

According to an embodiment of the disclosure, a display apparatus includes: a main body including a display and a connector; and an adapter connectable to the main body and configured to supply power to the connected main body, the adapter including: a transformer configured to boost an input first alternating current (AC) voltage, a switch including a switching device configured to switch a current flowing in the transformer, a controller configured to control the switching device to output a second AC voltage boosted by the transformer, and the main body including a power factor correction (PFC) converter configured to correct a power factor of the second AC voltage output from the adapter and output a direct current (DC) voltage.

The transformer may be provided in plural, and the transformers include primary sides to which the first AC voltage is input in parallel and secondary sides connected in series to each other.

The switch may be provided in plural corresponding to the transformers, and the controller may output one driving signal to the switches.

The adapter may further include: a first rectifier configured to rectify the input first AC voltage; and a second rectifier configured to rectify the boosted second AC voltage, and the controller may detect the rectified second AC voltage, and control the second AC voltage to be constant based on a result of the detection.

The controller may detect an average voltage or a peak voltage of the second AC voltage, and control the average voltage or the peak voltage of the second AC voltage to be constant based on a result of the detection.

The controller may control a frequency or duty of the driving signal applied to the switch based on the result of the detection.

The transformer may include an LLC resonant converter.

The switch may include first to fourth switching devices, and may be switched over between a full-bridge mode or a half-bridge mode as the first to fourth switching devices are selectively turned on or off.

The controller may control the second switching device to be turned on, the fourth switching device to be turned off, and the first and third switching devices to be complementarily switched, based on the input first AC voltage higher than or equal to a preset first reference voltage.

The controller may control the driving signal applied to the first and third switching devices to be varied in frequency.

The controller may control the first and second switching devices to be complementarily switched, and the third and fourth switching devices to be complementarily switched, based on the input first AC voltage lower than the first reference voltage.

The controller may control the driving signal applied to the first to fourth switching devices to be varied in duty, based on the input first AC voltage higher than or equal to a preset second reference voltage.

The controller may control the driving signal applied to the first to fourth switching devices to be varied in phase, based on the input first AC voltage higher than or equal to the preset second reference voltage.

The controller may control the driving signal applied to the first to fourth switching devices is varied in frequency, based on the input first AC voltage lower than the preset second reference voltage.

According to an embodiment of the disclosure, an electronic apparatus includes: a connector connectable to a main body including a display; and an adapter configured to supply power to the connected main body and including: a transformer configured to boost an input first alternating current (AC) voltage, a switch including a switching device configured to switch a current flowing in the transformer, a controller configured to control the switching device to output a second AC voltage boosted by the transformer, and the second AC voltage output from the adapter may be subjected to power factor correction (PFC) and converted into a direct current (DC) voltage in the main body.

The transformer may be provided in plural, and the transformers include primary sides to which the first AC voltage is input in parallel and secondary sides connected in series to each other.

The switch may be provided in plural corresponding to the transformers, and the controller may output one driving signal to the switches.

The adapter may further include: a first rectifier configured to rectify the input first AC voltage; and a second rectifier configured to rectify the boosted second AC voltage, and the controller may detect the rectified second AC voltage, and control the second AC voltage to be constant based on a result of the detection.

The controller may detect an average voltage or a peak voltage of the second AC voltage, and control the average voltage or the peak voltage of the second AC voltage to be constant based on a result of the detection.

The controller may control a frequency or duty of the driving signal applied to the switch based on the result of the detection.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
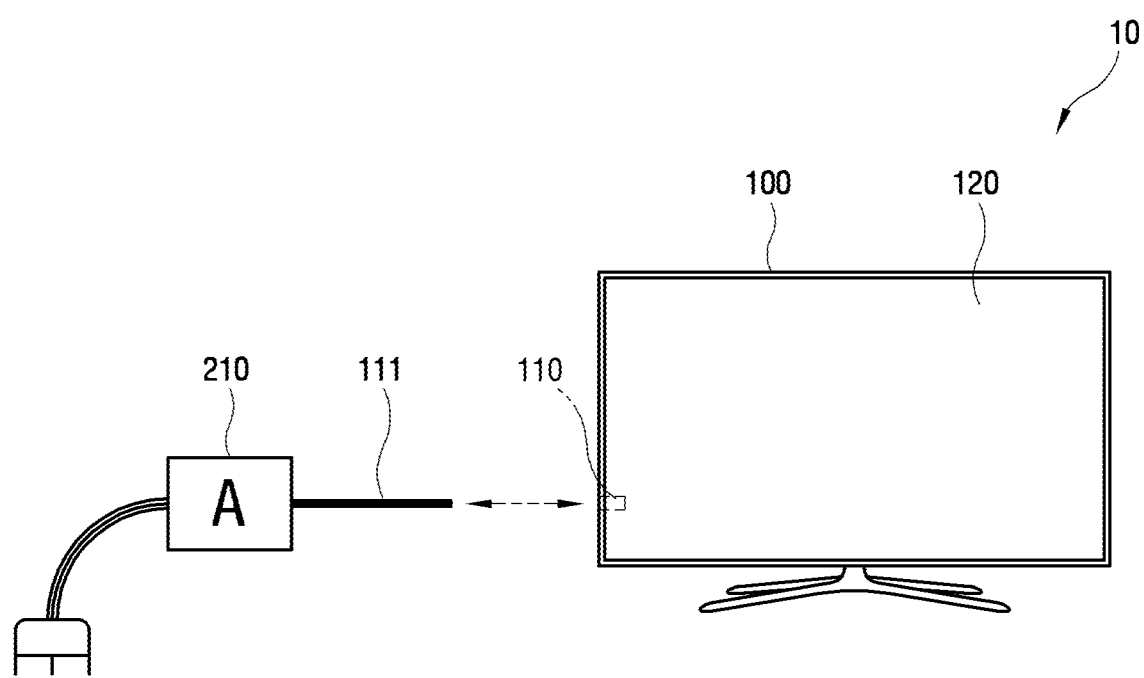
FIG. 1 is a schematic view showing a display apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide a display apparatus and an electronic apparatus which can stably receive power through a miniaturized and lightweight adapter including a high frequency transformer of which an input and an output can be electrically insulated.

Further, the disclosure is to provide a display apparatus and an electronic apparatus of which a power circuit has a simple structure in which a modularized alternating current (AC)/AC converter including a high frequency transformer is easily extensible corresponding to loads and a current balance of each module is secured.

Further, the disclosure provides a display apparatus and an electronic apparatus which can be efficiently used in various regions/countries by operating with input AC power of various levels and controlling an output voltage to be kept at a constant level.

FIG. 1 is a schematic view showing a display apparatus according to an embodiment of the disclosure.

A display apparatus 10 according to an embodiment of the disclosure, as shown in FIG. 1, includes a main body 100 and an adapter 210 connected to the main body 100 through a cable 111.

The adapter 210 is configured to supply power to the connected main body 100. According to an embodiment, the adapter 210 may be embodied by a high voltage adapter capable of raising an input voltage and outputting the raised voltage. In this case, the adapter 210 boosts an input first alternating current (AC) voltage, and outputs the boosted voltage as a second AC voltage to the main body 100.

According to an embodiment, as shown in FIG. 1, the display apparatus 10 includes a screen, i.e. a display 120 provided in the main body 100 and displaying an image thereon.

The main body 100 of the display apparatus 10 includes an adapter connector 110 to which the cable 111 is connectable for connection with the adapter 210, and thus receives AC power from the adapter 210 through the cable 111.

The AC power received in the main body 100 as described above is transformed into a direct current (DC) power having a predetermined level, and supplied as operation power to the display 120 and the like elements in the main body 100 of the display apparatus 10.

Figure 2:
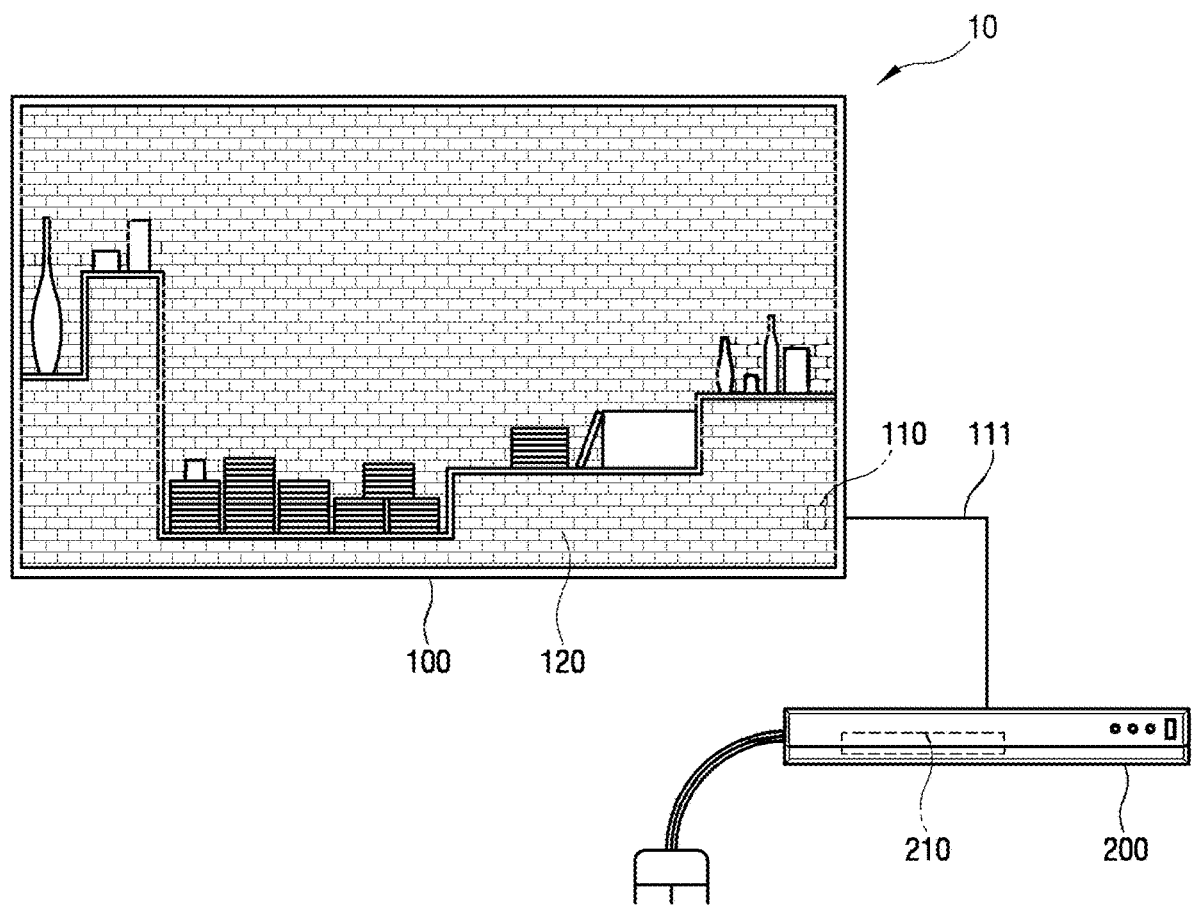
FIG. 2 illustrates an example that a display apparatus is installed according to an embodiment of the disclosure.

FIG. 2 illustrates an example that a display apparatus is installed according to an embodiment of the disclosure.

In the display apparatus 10 according to an embodiment, the adapter 210 may, as shown in FIG. 2, be provided inside an electronic apparatus 200 that is connected to the main body 100 through the cable 111 and outputs a signal to the main body 100.

However, there are no limits to the embodiment of the adapter 210 according to the disclosure, and thus the adapter 210 may be variously embodied.

For example, the adapter 210 may, as shown in FIG. 1, include an independent power supply separated from and connectable to the main body 100. In this case, the display apparatus 10 may include only the main body 100 without the adapter 210.

The main body 100 of the display apparatus 10 may, as shown in FIG. 2, connect with the electronic apparatus 200 that operates as an additional apparatus capable of outputting a signal corresponding to an image displayed on the display 120.

The electronic apparatus 200 may output a signal for displaying an image based on content, which is received from an external image source or stored therein, to the main body 100.

As shown in FIG. 2, the main body 100 and the electronic apparatus 200 are connected/accessed by a cable 111.

The main body 100 receives data such as video/audio (AV) signals and a control signal from the electronic apparatus 200 through the cable 111. Further, the main body 100 may receive power from the electronic apparatus 200 through the cable 111.

According to an embodiment, the adapter 210 may be included in a power supply of the electronic apparatus 200, which receives and transforms commercial power (AC power) through a wall outlet of a home, an office, etc., and the transformed power is output to the main body 100 through the cable 111, thereby supplying power to the main body 100.

The power supply, i.e. the adapter 210 may supply operation power to the elements of the electronic apparatus 200. In this case, the adapter 210 may further include a DC/DC converter.

The man body 100 and the electronic apparatus 200 are connected by a single cable 111 as shown in FIG. 2. Here, the cable 111 connecting the main body 100 and the electronic apparatus 200 may be embodied by an optical cable into which a cable for transmitting and receiving AV data and a power cable are combined. The optical cable transmits and receives information through an optic fiber that has a core and cladding. To this end, a signal converter by which an electric signal and an optical signal are converted into each other may be provided in each of connectors at transmitting and receiving sides.

According to an embodiment, the cable 111 connecting the main body 100 and the electronic apparatus 200 may be embodied by an invisible cable (hereinafter, referred to as a magic cable) not to spoil beauty even in a state that the main body 100 and the electronic apparatus 200 are connected.

However, the connection between the main body 100 according to the disclosure and the electronic apparatus 200 is not limited to the foregoing embodiment, and may employ wired or wireless interfaces based on various standards.

The wired interface may for example include a cable that complies with a predetermined standard. The wireless interface may for example include at least one of Wi-Fi, Wi-Fi direct, or Bluetooth.

In the display apparatus 10 according to an embodiment of the disclosure, the electronic apparatus 200 includes a media box as an auxiliary or appended apparatus that outputs a signal so that the display apparatus 10 can display images based on various pieces of content. In the display apparatus 10 according to an embodiment, the electronic apparatus 200 may also be referred to as a one-connect (OC) box because it is connected to the main body 100 by the invisible cable or the like single cable 111.

The electronic apparatus 200 receives content from a plurality of image sources, i.e. signal sources. According to an embodiment, the electronic apparatus 200 may transmit the content received from the image source to the main body 100 through the cable 111.

According to the disclosure, there are no limits to the kinds of image sources for providing content. For example, a set-top box (STB), a player for an optical disc such as Blu-ray disc or digital versatile disc (DVD), a personal computer (PC) such as a desktop or laptop computer, a mobile device including a smart pad such as a smartphone or a tablet computer, etc. Further, the electronic apparatus 200 may receive content provided in the form of a real-time streaming file through a wired or wireless network.

According to an embodiment, the display apparatus 10 may be embodied in a television (TV) that displays broadcast content.

According to an embodiment, the display apparatus 10 may operate as a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

However, the display apparatus 10 according to the disclosure is not limited to the TV, and any apparatus may be included in the display apparatus as long as it can operate by receiving the AC power through the adapter 210. In other words, the display apparatus 10 may for example include various types of apparatuses such as a personal computer such as a laptop or desktop computer (or a monitor connected to a computer main body), various household devices, etc.

When the display apparatus 10 is embodied as the TV, the electronic apparatus 200 may receive broadcast content based on at least one of a broadcast signal, broadcast information or broadcast data from a transmitter of a broadcasting station.

The electronic apparatus 200 may wirelessly receive a radio frequency (RF) signal, i.e. a broadcast signal from the broadcasting station. To this end, the electronic apparatus 200 may include an antenna configured to receive a broadcast signal, and a tuner configured to be tuned to a channel corresponding to a broadcast signal.

Here, the broadcast signal may be received through a terrestrial wave, a cable, a satellite, etc., and a signal source is not limited to the broadcasting station. That is, any apparatus or station capable of transmitting and receiving data may be included in the image source according to the embodiment.

The standards of the signal received in the electronic apparatus 200 may be varied depending on the types of the display apparatus 10, and may for example receive image content based on high definition multimedia interface (HDMI), composite video, component video, super video, syndicat des constructeurs des appareils radiorécepteurs et téléviseurs (SCART), universal serial bus (USB), and the like standards by a wire.

The electronic apparatus 200 may receive content from various external apparatuses including a server through wired or wireless network communication, and there are no limits to the kinds of communication.

Specifically, the electronic apparatus 200 may perform at least one of wireless communication using an access point (AP) or wireless communication directly connected to other apparatuses without the AP. For example, the electronic apparatus 200 may receive content from an image source through Wi-Fi, Wi-Fi Direct, Bluetooth or the like wireless network communication. Alternatively, the electronic apparatus 30 may receive content through Ethernet or the like wired network communication.

The electronic apparatus 200 provides content, received by various methods as described above, to the main body 100, so that an image based on the corresponding content can be output to, i.e. displayed on the display 120.

According to another embodiment, the main body 100 may directly receive content from an external image source without the electronic apparatus 200. For example, the main body 100 of the display apparatus 10 according to the disclosure may be configured to receive a broadcast signal/an image signal from an external signal source by a wire or wirelessly based on at least one of various above-described methods through a signal receiver (see '240' of FIG. 4) or a communicator (see '250' of FIG. 4).

Below, details of the display apparatus according to an embodiment of the disclosure will be described with reference to the accompanying drawings.

Figure 3:
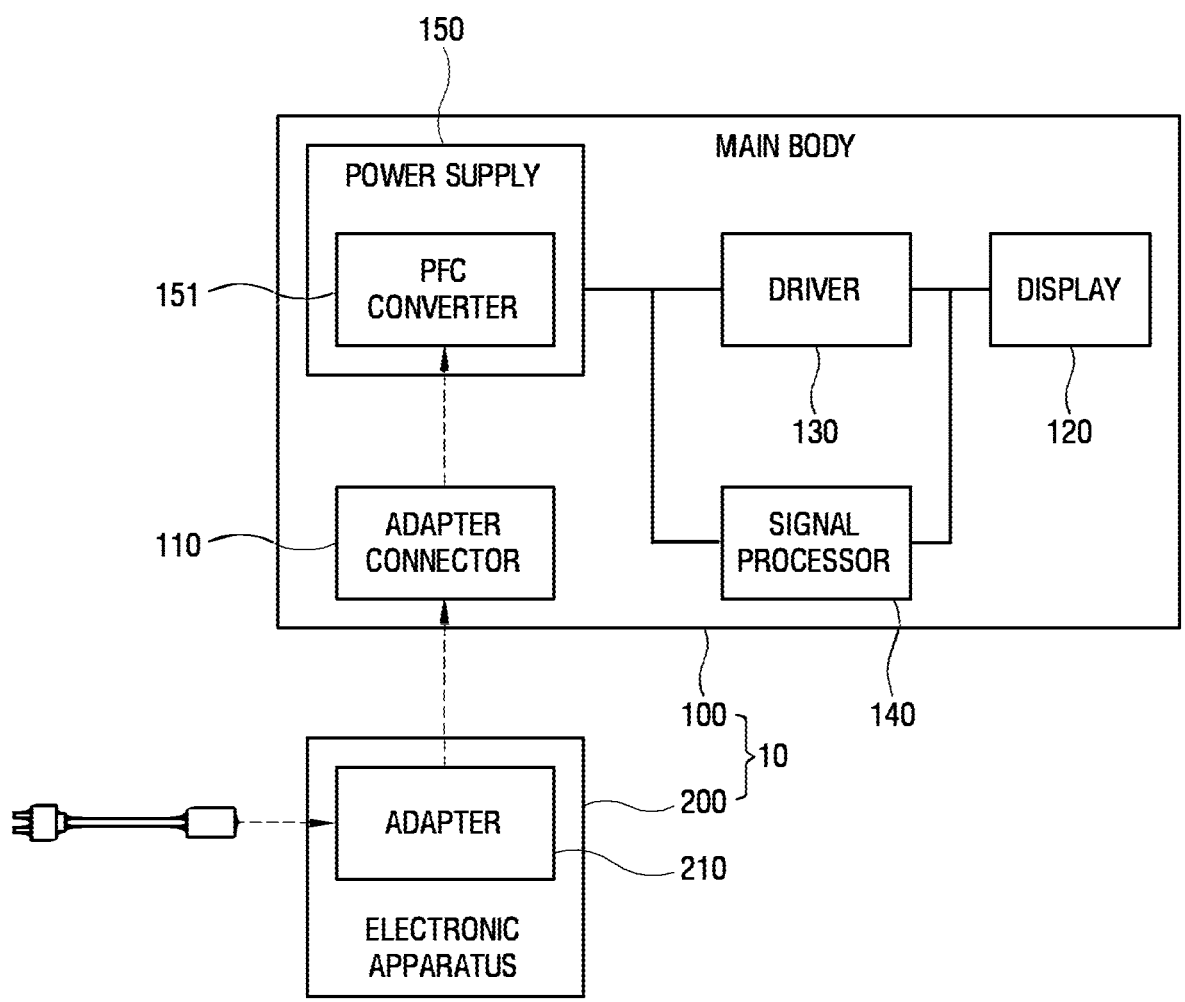
FIG. 3 is a block diagram of a main body in a display apparatus according to an embodiment of the disclosure.
Figure 4:
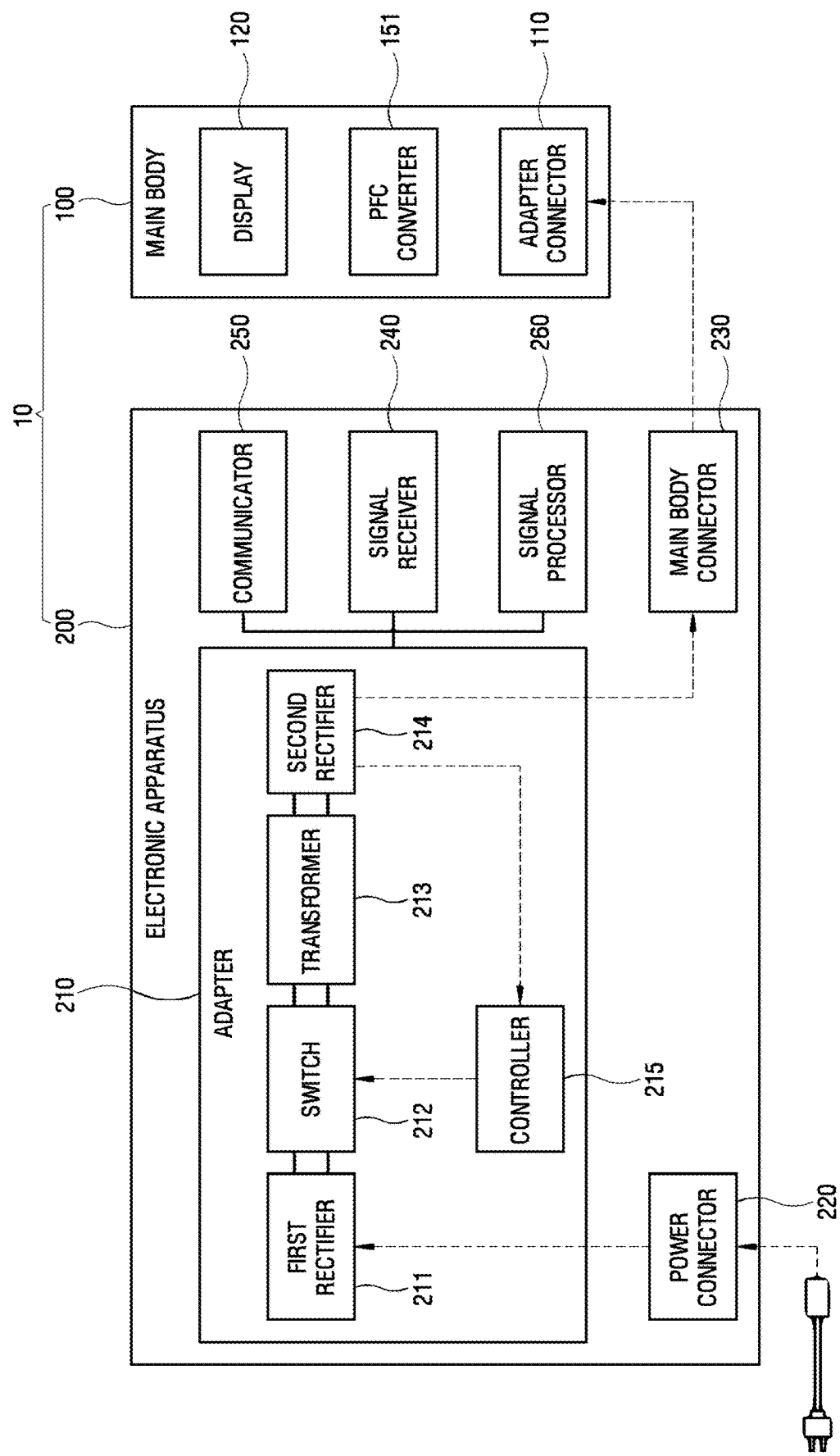
FIG. 4 is a block diagram of an electronic apparatus connectable to a main body in a display apparatus according to an embodiment of the disclosure.

FIG. 3 is a block diagram of a main body in a display apparatus according to an embodiment of the disclosure, and FIG. 4 is a block diagram of an electronic apparatus connectable to a main body in a display apparatus according to an embodiment of the disclosure.

In the display apparatus 10 according to an embodiment of the disclosure, the main body 100 may, as shown in FIG. 3, include the adapter connector 110, the display 120, a driver 130, a signal processor 140 and a power supply 150.

According to the disclosure, the elements included in the main body 100 are not limited to the embodiment shown in FIG. 2, but may exclude some elements or include other additional elements (for example, a storage for storing data, a user input receiver for receiving a user input like a remote controller or a control panel, etc.).

The adapter connector 110 receives video/audio (AV) signals or the like data and a control signal from the electronic apparatus 200 through the cable 111.

Further, the adapter connector 110 may receive power from the electronic apparatus 200 through the cable 111. According to an embodiment, the adapter connector 110 may receive a second AC voltage boosted by the adapter 210 from the electronic apparatus 200.

The adapter connector 110 may be embodied by a connection terminal or connector with which the electronic apparatus 200 connects by the cable 111.

According to an embodiment, the adapter connector 110 may be provided in a video board on which image processing elements of the signal processor 140 are mounted. However, the adapter connector 110 according to the disclosure is not necessarily provided in the video board, but may be provided in another position, for example, a power board on which the elements of the power supply 150 are mounted, or the like separate place.

The display 120 displays an image based on content autonomously received or stored therein or received from the electronic apparatus 200. According to an embodiment, the display 120 may include a panel for a screen on which an image is displayed.

There are no limits to the types of the display 120, and the display 120 may be embodied by various display types such as liquid crystal, plasma, a light-emitting diode, an organic light-emitting diode, a surface-conduction electron-emitter, a carbon nano-tube, nano-crystal, etc.

The driver 130 is configured to drive the display 120 on which an image is displayed. According to an embodiment, the driver 130 may be embodied by a T-con board, i.e. a driving board provided with a timing controller that processes image data and generates a timing control signal to drive the display 210.

The signal processor 140 performs various preset video/audio processes with regard to a signal of content. The signal processor 140 outputs an image signal generated or combined by such processes to the display 120, so that an image based on the image signal can be displayed on the display 120.

The image signal processed in the signal processor 140 may be based on data provided by the electronic apparatus 200, or data stored in a flash memory, a hard disk drive, or the like nonvolatile internal storage. Further, the image signal processed in the signal processor 140 may correspond to the content directly received from an external image source to the display apparatus 10.

The signal processor 140 includes a video decoder for decoding an image signal to have an image format of the display apparatus 10, and a scaler for adjusting the image signal to correspond to the output standards of the display 120.

According to an embodiment, the decoder may for example be embodied by an H.264 decoder, but not limited thereto. In other words, the video decoder in this embodiment may for example be embodied by a moving picture experts group (MPEG) decoder, a high efficiency video codec (HEVC) decoder, or the like decoders corresponding to various compression standards.

Further, there are no limits to the kinds of content to be processed by the signal processor 140 according to the disclosure. For example, the content to be processed by the signal processor 140 may include not only a moving picture like a video, but also a still picture such as a picture of joint photographic experts group (JPEG) file, a background image, a graphic user interface (GUI), etc.

Here, there are no limits to the kinds of video processing process performed in the signal processor 140. For example, the signal processor 140 may for example perform at least one of various processes such as de-interlacing for converting an interlaced broadcast signal into a progressive broadcast signal, detail enhancement, frame refresh rate conversion, line scanning, etc.

The signal processor 140 may be embodied by a group of individual components for independently performing processes to process an image signal, or a main system-on-chip (SoC) where various functions are integrated. The main SoC may include at least one processor provided to generally control the main body 100.

The processor may be embodied by at least one general-purpose processor that loads at least a part of a control program from a nonvolatile memory installed with the control program to a volatile memory and executes the loaded control program, and may for example be embodied by a central processing unit (CPU), an application processor (AP) or a microprocessor.

According to an embodiment, the signal processor 140 may be embodied by a video board including circuit elements such as various chipsets for performing respective processes, a memory, electronic parts, wirings, etc. which are mounted on to a printed circuit board (PCB). In this case, the signal processor 140 and the foregoing processor of the main body 100 may be provided on a single video board. Of course, this is merely an example, and they may be arranged on a plurality of PCBs connecting and communicating with each other.

The power supply 150 may transform an AC voltage input through the adapter connector 110 into a DC voltage having a predetermined level.

According to an embodiment, the power supply 150 includes a power factor correction (PFC) converter 151 that corrects a power factor of the second AC voltage received from the adapter 210 through the adapter connector 110 and outputs a DC voltage.

The DC voltage transformed by the power supply 150 may be supplied as operation power to each element of the main body 100, for example, the display 120, the driver 130, the signal processor 140, etc. According to an embodiment, the power supply 150 may be embodied by the power board as a PCB onto which circuit elements such as various chipsets, a memory, electronic parts, wiring lines, etc. forming a power circuit are mounted.

According to an embodiment of the disclosure, the electronic apparatus 200 may, as shown in FIG. 4, include the adapter 210, a power connector 220, a main body connector 230, a signal receiver 240, a communicator 250, and a signal processor 260.

According to the disclosure, the elements included in the electronic apparatus 200 are not limited to the embodiment shown in FIG. 4, but may exclude some elements or include other additional elements (for example, a storage for storing data, a user input receiver for receiving a user input like a remote controller or a control panel, etc.).

The adapter 210 may, as shown in FIG. 4, include a first rectifier 211 rectifying a first AC voltage received through the power connector 220, a switch 212 performing switching based on an operation frequency, a transformer 213 transferring power from a primary side to a secondary side based on a switching operation of the switch 212 and outputting a second AC voltage booted from the first AC voltage, a second rectifier 214 rectifying the second AC voltage output from the transformer 213, and a controller 215 controlling the switch 212 to output the second AC voltage boosted by the transformer 213.

According to an embodiment, the adapter 210 may be embodied by a power board including circuit elements such as various chipsets corresponding to the foregoing elements 211, 212, 213, 214a and 215, a memory, electronic parts, wirings, etc. which are mounted on to a PCB.

The second AC voltage rectified in the second rectifier 214 is supplied to the main body 100 through the main body connector 230, and converted into the DC voltage by the PFC converter 151 so as to be supplied as operation power for each element of the main body 100.

The power connector 220 may for example receive the commercial power of the first AC voltage through the wall outlet, etc. According to an embodiment, the power connector 220 may be embodied by an AC inlet to which AC power is input, and may for example receive an AC voltage of 90V~264V.

The main body connector 230 outputs the second AC voltage to the main body 100 through the cable 111. The main body connector 230 may be embodied by a connection terminal or connector with which the main body 100 connects by the cable 111.

According to an embodiment, the main body connector 230 may be provided in a video board on which image processing elements of the signal processor 260 are mounted. However, the main body connector 230 according to the disclosure is not necessarily provided in the video board, but may be provided in another position, for example, the power board on which the elements of the adapter 210 are mounted, or the like separate place.

The signal receiver 240 receives a signal of content (i.e. an image signal) from the outside and transmits it to the signal processor 260. The standards of the received signal may be varied depending on the types of the display apparatus 10. For example, the signal receiver 240 may receive a RF signal from a broadcasting station (not shown) wirelessly, or may receive an image signal based on composite video, component video, super video, SCART, HDMI and the like standards by a wire. The signal receiver 240 may be embodied by a communication circuitry including a data input/output interface where communication modules (an S/W module, a chip, etc.), ports, etc. are combined corresponding to various kinds of communication protocols.

According to an embodiment, the signal receiver 240 may include a tuner to be tuned to a channel for a broadcast signal when the image signal is the broadcast signal. Further, the image signal may be received from various peripheral apparatuses. Further, the image signal may be based on data received through the Internet or the like network. In this case, the electronic apparatus 200 may receive the image signal through the communicator 250 to be described later.

Further, the image signal may be based on data stored in a flash memory, a hard disk drive (HDD), and the like nonvolatile storage. The storage may be provided inside or outside the electronic apparatus 200. When the storage 450 is provided at the outside, a connector (not shown) may be added for connection with the storage.

The communicator 250 is configured to communicate with at least one external apparatus by a wired or wireless communication method. The communicator 250 includes a wired and/or wireless communication module. The communicator 250 may be embodied by a communication circuitry including communication modules (an S/W module, a chip, etc.) corresponding to various kinds of communication protocols.

According to an embodiment, the communicator 250 includes a WLAN unit. The WLAN unit may perform communication with at least one external apparatus through an access point (AP), i.e. a relay apparatus, and may include a Wi-Fi communication module.

According to an embodiment, the communicator 250 includes at least one of modules for short-range communication such as Bluetooth, Bluetooth low energy, RF communication, Wi-Fi Direct, Zigbee, ultrawideband (UWB), near field communication (NFC), infrared data association (IrDA) communication, etc. The short-range communication module is configured to support direct communication between the electronic apparatus 200 and at least one external apparatus without the AP.

According to an embodiment, the communicator 250 may further include a wired communication module such as Ethernet, etc.

The communicator 250 of the electronic apparatus 200 according to an embodiment of the disclosure may be embodied by one among the WLAN unit, the short-range communication module, and the wired communication module or combination of two among them according to required performance.

The signal processor 260 performs various preset video/audio processing processes with regard to the image signal received through the signal receiver 240 or the communicator 250. The signal processor 260 outputs an output signal, which is generated or combined by performing such an video processing process, to the main body 100 through a cable 111 connecting the main body connector 230 and the adapter connector 110 of the main body 100, so that the display 210 can display an image based on the image signal.

The signal processor 260 in this embodiment includes a decoder for decoding an image signal to have an image format for the display apparatus 10, and a scaler for scaling the image signal according to the output standards of the display 210. The decoder in this embodiment may for example be embodied by a moving picture experts group (MPEG) decoder. Here, there are no limits to the kinds of video processing process performed in the signal processor 260 according to this embodiment. For example, the video processing process may perform at least one of various processes such as de-interlacing for converting an interlaced broadcast signal into a progressive broadcast signal, noise reduction for improving image quality, detail enhancement, frame refresh rate conversion, line scanning, etc.

The signal processor 260 may be embodied by a group of individual components for independently performing processes to process an image signal, or a main SoC where various functions are integrated. The main SoC may further include at least one processor provided to generally control the electronic apparatus 200.

The processor may be embodied by at least one of general-purpose processors that load at least a part of a control program from a nonvolatile memory installed with the control program to a volatile memory and executes the loaded control program, and may for example be embodied by a CPU, an application processor (AP) or a microprocessor.

According to an embodiment, the signal processor 260 may be embodied by a video board including circuit elements such as various chipsets for performing respective processes, a memory, electronic parts, wirings, etc. which are mounted on to a PCB. In this case, the signal receiver 240, the signal processor 260 and the processor of the electronic apparatus 200 may be provided on a single video board. Of course, this is merely an example, and they may be arranged on a plurality of PCBs connecting and communicating with each other.

Figure 5:
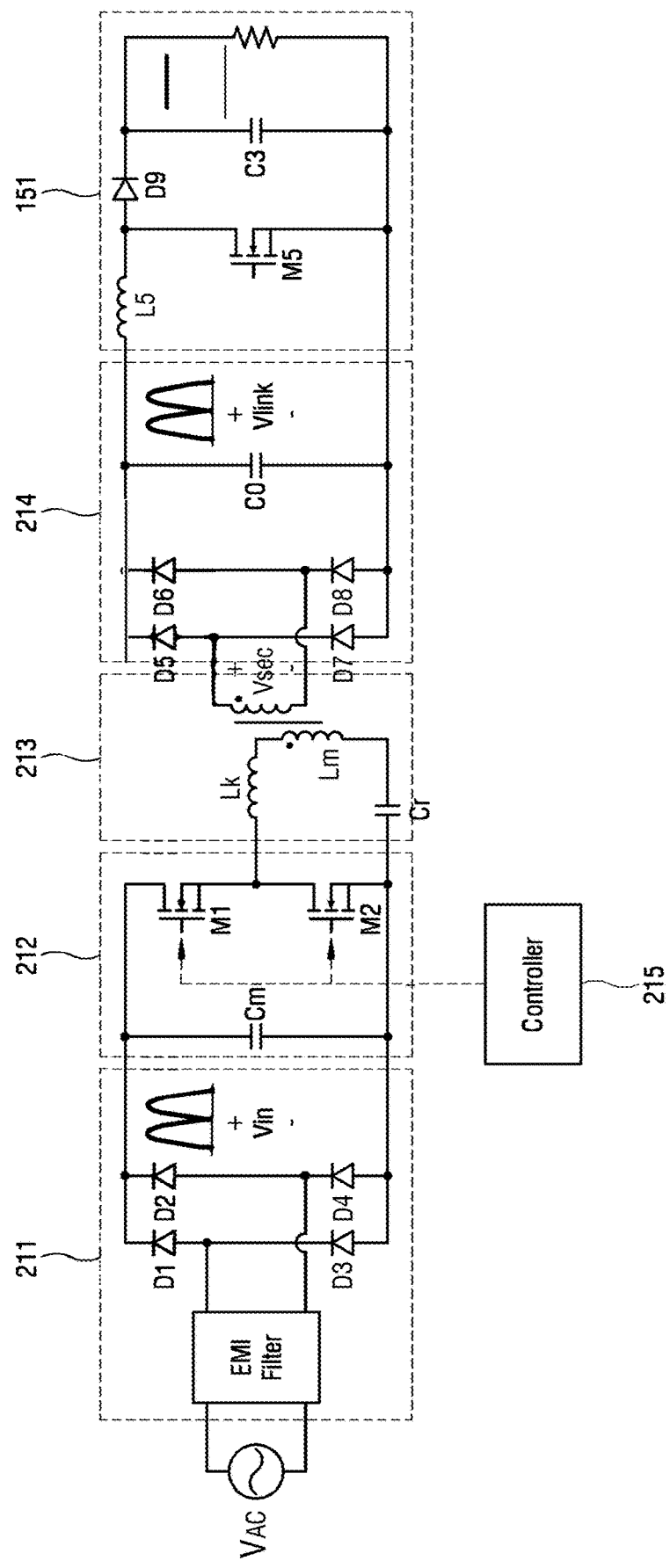
FIG. 5 illustrates an example of a power circuit in a display apparatus according to an embodiment of the disclosure.
Figure 6:
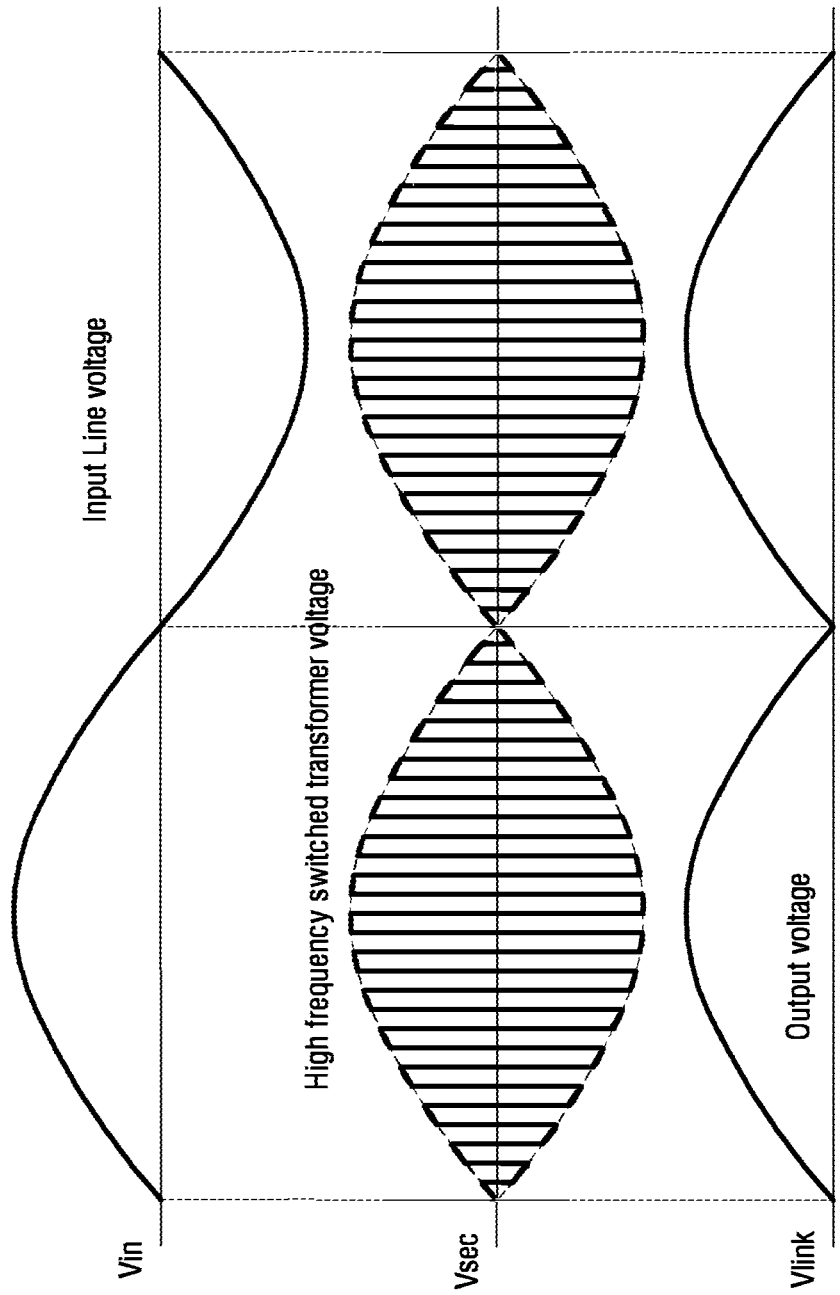
FIG. 6 illustrates waveforms based on operations of the power circuit of FIG. 5.

FIG. 5 illustrates an example of a power circuit in a display apparatus according to an embodiment of the disclosure, and FIG. 6 illustrates waveforms based on operations of the power circuit of FIG. 5.

In the display apparatus 10 according to an embodiment of the disclosure, the power circuit may, as shown in FIG. 5, include the first rectifier 211, the switch 212, the transformer 213, the second rectifier 214 and the PFC converter 151.

In the display apparatus 10 according to an embodiment, as shown in FIGS. 3 and 4, the first rectifier 211, the switch 212, the transformer 213 and the second rectifier 214 are provided in the adapter 210 to which commercial power is input, and the PFC converter 151 is provided in the main body 100 corresponding to a load side. Further, the adapter 210 may be provided in the electronic apparatus 200 provided as an additional apparatus connected to the main body 100 by the cable 111 and output a signal to the main body 100.

In other words, the power circuit includes the adapter 210 including the transformer 213 and the PFC converter 151 are spaced/separated from each other in the display apparatus 10 according to an embodiment, and it is thus possible to miniaturize and lighten the adapter 210. Here, the adapter 210 may serve as an AC/AC converter that boosts the input first AC voltage into the second AC voltage and output the second AC voltage.

The first rectifier 211 rectifies the first AC voltage Vin Input Line Voltage having a line voltage form as shown in FIG. 6.

According to an embodiment, the first rectifier 211 may include an electromagnetic interference (EMI) filter for filtering out noise from the input first AC voltage, and a diode bridge circuit including a plurality of diodes D1, D2, D3 and D4 and applying full-wave rectification to input power.

The first AC voltage Vin rectified in the first rectifier 211 may for example be AC 60 Hz line voltage.

The switch 212 includes switching devices M1 and M2 to switch an electric current flowing in the transformer 213. According to an embodiment, there may be provided a plurality of switches 212. The switch 212 may for example be embodied in a half-bridge form using two switching devices M1 and M2 as shown in FIG. 5. However, the switch 212 is not limited to the embodiment shown in FIG. 5, but may for example be embodied in a full-bridge form using four or more switching devices.

The switching devices M1 and M2 perform switching based on a signal output from the controller 215, and the switching causes power to be transferred from the primary side of the transformer 213 to the secondary side.

According to an embodiment, the switching devices M1 and M2 perform switching at high speed so that a high frequency pulse Vsec High frequency switched transformer voltage generated from the first AC voltage Vin can be applied to the transformer 213 as shown in FIG. 6, thereby causing electric insulation between an input and an output through the transformer 213. In the foregoing adapter 210 according to an embodiment of the disclosure, the transformer 213 may be embodied by a miniaturized and lightweight high frequency transformer to which the high frequency pulse Vsec.

According to an embodiment, the transformer 213 may, as shown in FIG. 5, employ an LLC resonant converter that includes a resonance inductor LK, a magnetized inductor Lm of the transformer, and a resonance capacitor CR.

However, in the display apparatus 10 of the disclosure, there are no limits to the form of the transformer 213, and one among various forms of converters may be used for the transformer 213.

The second rectifier 214 rectifies the high frequency pulse Vsec generated through the transformer 213 as described above, and outputs the second AC voltage.

The second rectifier 214 includes a plurality of diodes D5, D6, D7 and D8 and a capacitor Co to output an output voltage Vlink Output voltage having a rectified sinusoidal wave as shown in FIG. 6. According to an embodiment, the second rectifier 214 may output a sinusoidal voltage of 120 Hz.

The controller 215 may output a driving signal to the switching devices M1 and M2 of the switch 212, and control the switching devices M1 and M2 to perform switching to output the second AC voltage boosted by the transformer 213. Here, the controller 215 gets a feedback of the output voltage from the second rectifier 214, and modulates/changes an operation frequency or a duty ratio (i.e. a duty rate) of a signal applied to the switching devices M1 and M2.

Specifically, the controller 215 gets, i.e. detects the feedback of the rectified second AC voltage as the output voltage of the second rectifier 214, and controls the output second AC voltage to have a constant level based on a detection result.

Here, the controller 215 detects an average voltage or a peak voltage of the second AC voltage, and controls the average voltage or the peak voltage to be maintained constant.

Figure 7:
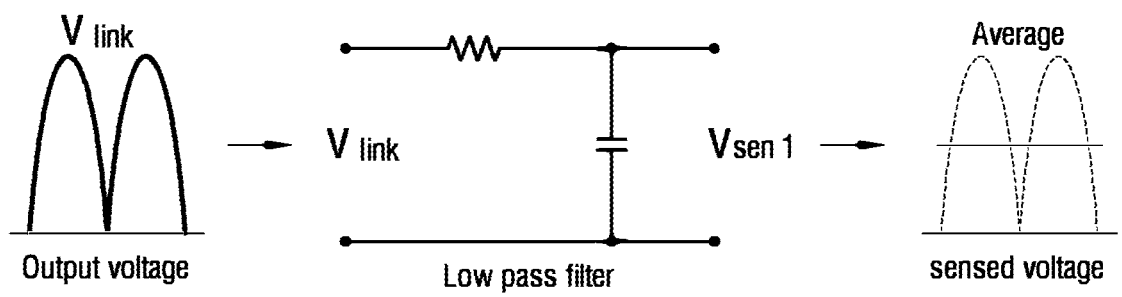
FIG. 7 is a view for describing that the power circuit of FIG. 5 controls an average of an output voltage.
Figure 8:
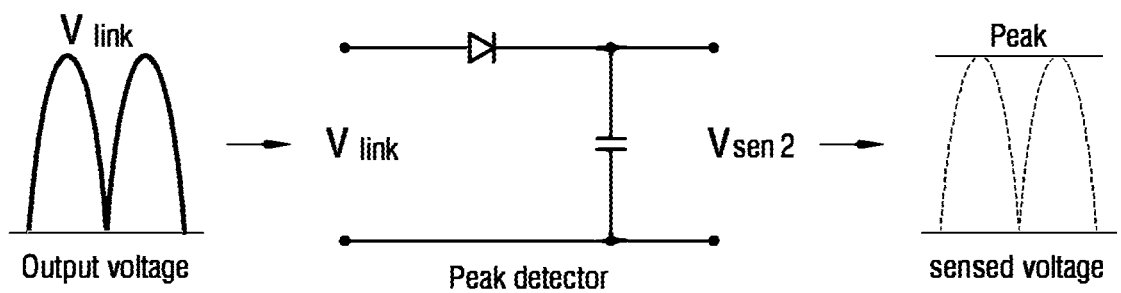
FIG. 8 is a view for describing that the power circuit of FIG. 5 controls a peak of an output voltage.

FIG. 7 is a view for describing that the power circuit of FIG. 5 controls an average of an output voltage, and FIG. 8 is a view for describing that the power circuit of FIG. 5 controls a peak of an output voltage.

According to an embodiment, the controller 215 may, as shown in FIG. 7, control the output second AC voltage Vlink Output Voltage to pass through a low pass filter (LPF), thereby detecting its average value (or average voltage) Vsen1.

According to another embodiment, the controller 215 may, as shown in FIG. 8, control the output second AC voltage Vlink to pass through a peak detector, thereby detecting its peak voltage (or peak voltage) Vsen2.

The controller 215 may output a driving signal to control the average voltage or the peak voltage of the second AC voltage output from the second rectifier 214 to be maintained constant based on the output voltage Vsen2 or Vsen2 detected as above.

Meanwhile, according to an embodiment, the controller 215 modulates/changes one of the duty ratio or operation frequency of the driving signal based on the level of the input first AC voltage, thereby controlling the switching of the switching devices M1 and M2. In this regard, details will be described in the embodiments to be described later with reference to FIGS. 16 to 24.

The PFC converter 151 corrects the power factor of the second AC voltage Vlink output from the second rectifier 214, and converts the second AC voltage into the DC voltage to be provided as an operation voltage to the elements of the main body 100.

The PFC converter 151 corrects the power factor of the second AC voltage received from the second rectifier 214, and converts the second AC voltage into the DC voltage having a predetermined level. The PFC converter 151 may correct the power factor of the second AC voltage by decreasing reactive power and increasing active power, making voltage/current in phase with each other, etc.

According to an embodiment, the PFC converter 151 may, as shown in FIG. 5, for example be designed as a switching-type PFC AC/DC converter that includes a switching device M5 turned on or off at a predetermined ratio based on a pulse width modulation (PWM) control signal, but not limited to this embodiment.

When the switching device M5 is turned on, a current flows in a path of an inductor L5 and the switching device M5, and thus power is stored in the inductor L5. On the other hand, when the switching device M5 is turned off, a current flows in a path of the inductor L5 and the capacitor C3, and thus the power stored in the inductor L5 is transferred to the capacitor C3. The power transferred to the capacitor C3 may be supplied as the DC voltages having a predetermined level, i.e. as the operation voltages to the loads, i.e. the elements of the main body 100.

In the foregoing display apparatus 10 according to an embodiment of the disclosure, the high frequency switched mode AC line transformer is applied to the adapter 210 performing voltage boosting and AC/AC converting, and the PFC converter 151 for the AC/DC converting is provided in the main body 100 corresponding to the load side, thereby miniaturizing and lightening the adapter 210 and promoting safety based on electric insulation.

Meanwhile, in the display apparatus according to an embodiment of the disclosure, the adapter may be embodied to include a plurality of transformers.

Figure 9:
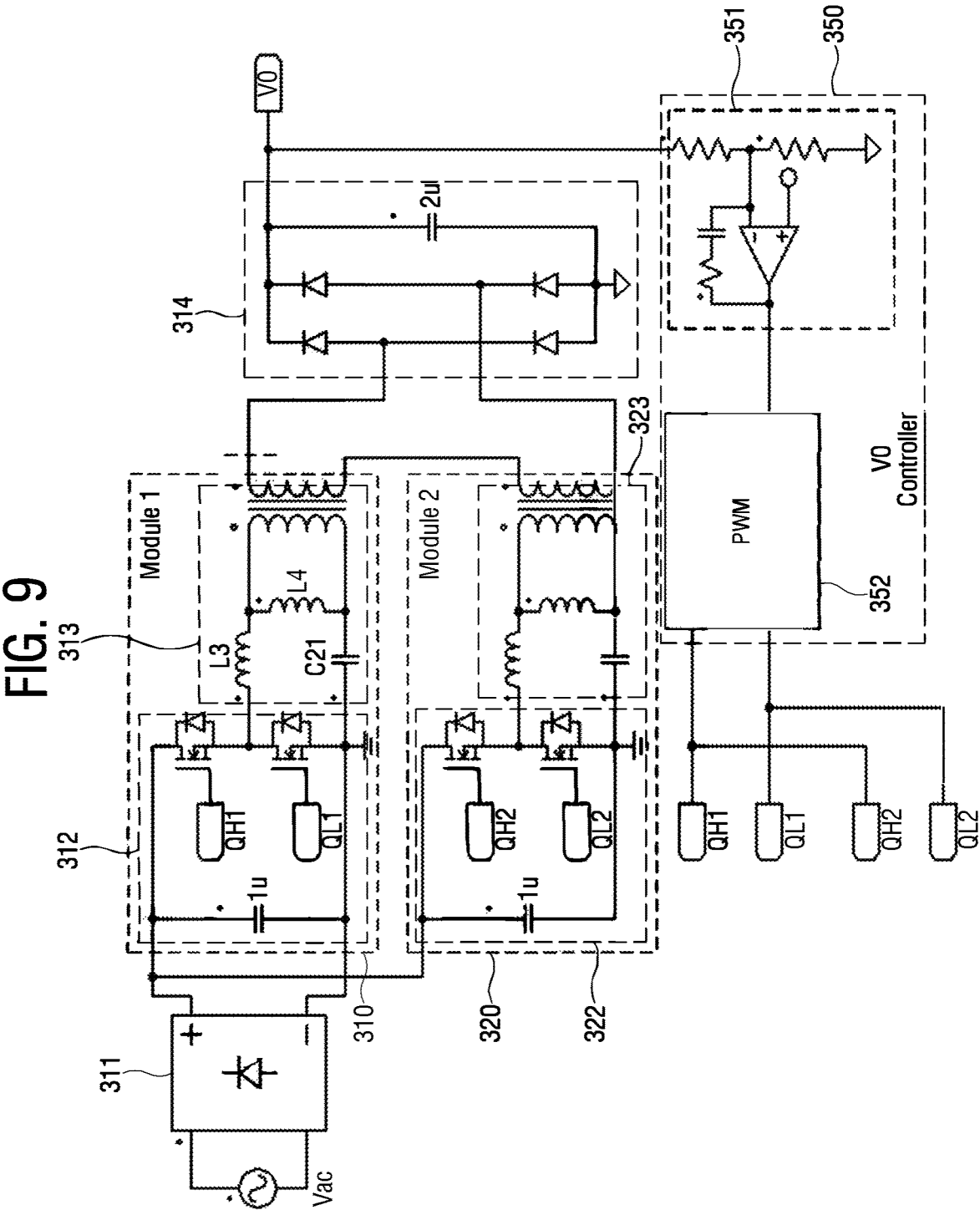
FIG. 9 illustrates an example of a power circuit with two transformers in a display apparatus according to an embodiment of the disclosure.
Figure 10:
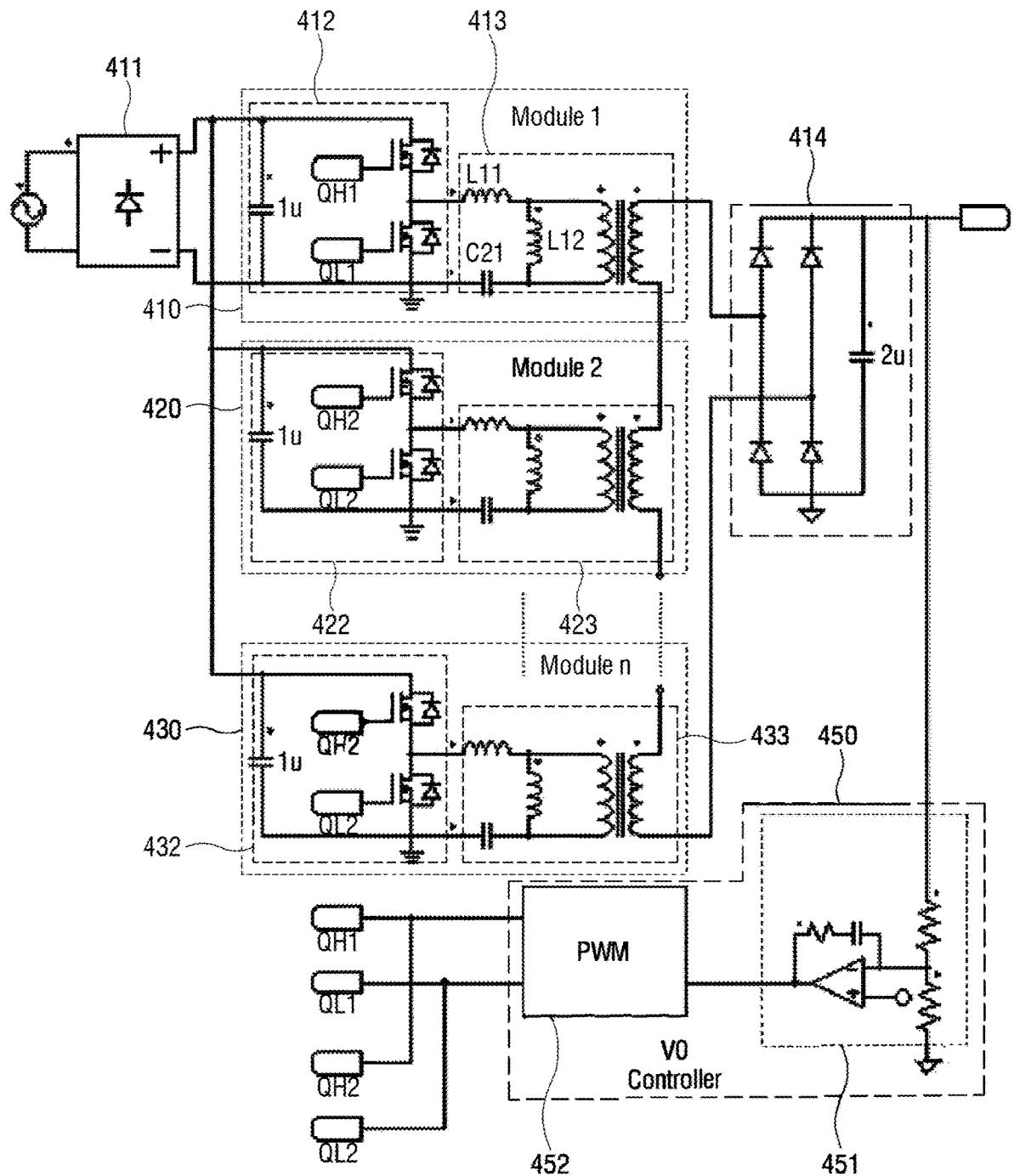
FIG. 10 illustrates an example of a power circuit with three or more transformers in a display apparatus according to an embodiment of the disclosure.

FIG. 9 illustrates an example of a power circuit with two transformers in a display apparatus according to an embodiment of the disclosure, and FIG. 10 illustrates an example of a power circuit with three or more transformers in a display apparatus according to an embodiment of the disclosure.

According to an embodiment, the power circuits shown in FIGS. 9 and 10 may be provided in the adapter 210 connected to the main body 100 by the cable 111 and outputting the AC voltage.

The adapter 210 may, as shown in FIG. 9, include a first rectifier 311, a second rectifier 314, and a controller 350, and be provided with two switches 312 and 322 and two transformers 313 and 323.

The first rectifier 311, the switches 312 and 322, the transformers 313 and 323, the second rectifier 314 and the controller 350 shown in the circuit of FIG. 9 are equivalent to the first rectifier 211, the switch 212, the transformer 213, the second rectifier 214 and the controller 215 shown in the circuit shown in FIG. 5, respectively. Thus, the elements of the same name perform the same operation, and thus repetitive descriptions thereof will be avoided as necessary.

In the following embodiments, the configuration that includes the transformer for boosting the input first AC voltage and the switch including the switching device for switching the current flowing in the transformer will be defined as a transfer module (hereinafter, referred to as a "module").

Therefore, according to an embodiment shown in FIG. 9, the adapter 210 is provided with a first transformer module 310 (Module 1) that includes a first switch 312 and a first transformer 313 and a second transformer module 320 (Module 2) that includes a second switch 322 and a second transformer 323.

The first transformer module 310 and the second transformer module 320 receive in parallel the first AC voltage rectified by the first rectifier 311. In other words, the same first AC voltage is applied to the primary coils of the first transformer 313 and the second transformer 323 in parallel.

As shown in FIG. 9, the secondary coils of the first transformer 313 and the second transformer 323 are connected in series to each other. In other words, the output terminals of the first transformer module 310 and the second transformer module 320 are connected in series to each other.

Therefore, in the display apparatus 10 according to an embodiment of the disclosure shown in FIG. 9, the adapter 210 includes two transformers 313 and 323 of which the secondary sides are connected in series to each other, thereby having twice as much capability of supplying the output voltage to the load side as a single transformer.

The controller 350 includes a feedbacker 351 for receiving the output voltage from the second rectifier 314, and a driver 352 for outputting a driving signal to the switching devices of the first switch 312 and the second switch 322 based on the feedback voltage. Here, the controller 350 gets, i.e. detects the feedback of the rectified second AC voltage as the output voltage in the same method as described with reference to FIG. 7, and control the output second AC voltage to have a constant level based on the detection result.

According to an embodiment, the controller 350 applies the same driving signal to the first switch 312 and the second switch 322.

Specifically, the driving signal output from the driver 352 may, as shown in FIG. 9, include a high signal QH to be applied to a high-side switch and a low signal QL to be applied to a low-side switch. The driving signal is input to each of the switches 312 and 322, so that the high signals QH1 and QH2 can be applied to the high-side switches and the low signals QL1 and QL2 can be applied to the low-side switches. Here, the high signal and the low signal may for example have a phase difference of 180 degrees.

Accordingly, the two transformer modules 310 and 320 are controllable by one controller 350, and thus the controller is not separately needed for an additional transformer module even when the additional transformer module is provided for a high output voltage.

In the display apparatus 10 according to an embodiment of the disclosure, the transformer module is added to the adapter 210 as shown in FIG. 10 in such a manner that the output terminals are connected to one another in series as shown in FIG. 9, thereby having variable capacity of supplying the output voltage depending on the loads to which power is supplied. In FIG. 10, there are no limits to the number of additional transformer modules.

The adapter 210 may, as shown in FIG. 10, include a first rectifier 411, a second rectifier 414, and a controller 450, a plurality of, i.e. n switches 412, 422, ..., 432 and n transformers 413, 423, ..., 433.

The first rectifier 411, the switches 412, 422, ..., 432, the transformers 413, 423, ..., 433, the second rectifier 414 and the controller 450 of the circuit shown in FIG. 10 are equivalent to the first rectifier 211, the switch 212, the transformer 213, the second rectifier 214 and the controller 215 of the circuit shown in FIG. 5, respectively. Thus, the elements of the same name perform the same operation, and thus repetitive descriptions thereof will be avoided as necessary.

According to an embodiment of the disclosure shown in FIG. 10, the adapter 210 is provided with n transformer modules 410, 420, ..., 430 (Module 1, Module 2, ..., Module n) including the switches 412, 422, ..., 423 and the transformers 413, 423, ..., 433.

The transformer modules 410, 420, ..., 430 receive in parallel the first AC voltage rectified by the first rectifier 411.

In other words, the same first AC voltage is applied to the primary coils of the transformers 413, 423, ..., 433 in parallel.

As shown in FIG. 10, the secondary coils of the plurality of transformers 413, 423, ..., 433 are connected in series to each other. In other words, the output terminals of the plurality of transformers 413, 423, 433 are connected in series to each other.

Therefore, in the display apparatus 10 according to an embodiment of the disclosure shown in FIG. 10, the adapter 210 includes a plurality of transformers 413, 423, ..., 433, of which the secondary sides are connected in series to one another, thereby having variable capacity of supplying the output voltage. Thus, the output voltage, which is raised corresponding to the load that requires a high voltage level, can be supplied to the load side.

The controller 450 includes a feedbacker 451 for receiving the output voltage from the second rectifier 414, and a driver 452 for outputting a driving signal to the switching devices of the plurality of switches 412, 422, ..., 423 based on the feedback voltage.

According to an embodiment, the controller 450 applies the same driving signal to the switches 412, 422, ..., 423.

Specifically, the driving signal output from the driver 452 may, as shown in FIG. 10, include a high signal QH to be applied to a high-side switch and a low signal QL to be applied to a low-side switch. The driving signal is input to each of the switches 412, 422, ..., 423, so that the high signals QH1, QH2, ..., QH3 can be applied to the high-side switches and the low signals QL1, QL2, ..., QL3 can be applied to the low-side switches. Here, the high signal and the low signal may for example have a phase difference of 180 degrees.

Accordingly, n transformer modules 410, 420, ..., 430 are controllable by one controller 450, and thus the controller is not separately needed for additional transformer modules even though the transformer modules are added for extension as high capacity is required corresponding to a load.

As described in the embodiments shown in FIGS. 9 and 10, the adapter 210 including the plurality of transformer modules, of which the output terminals are connected in series, keeps a current balance between the transformer modules due to its structural features, and therefore does not need a separate configuration for the current balance.

Figure 11:
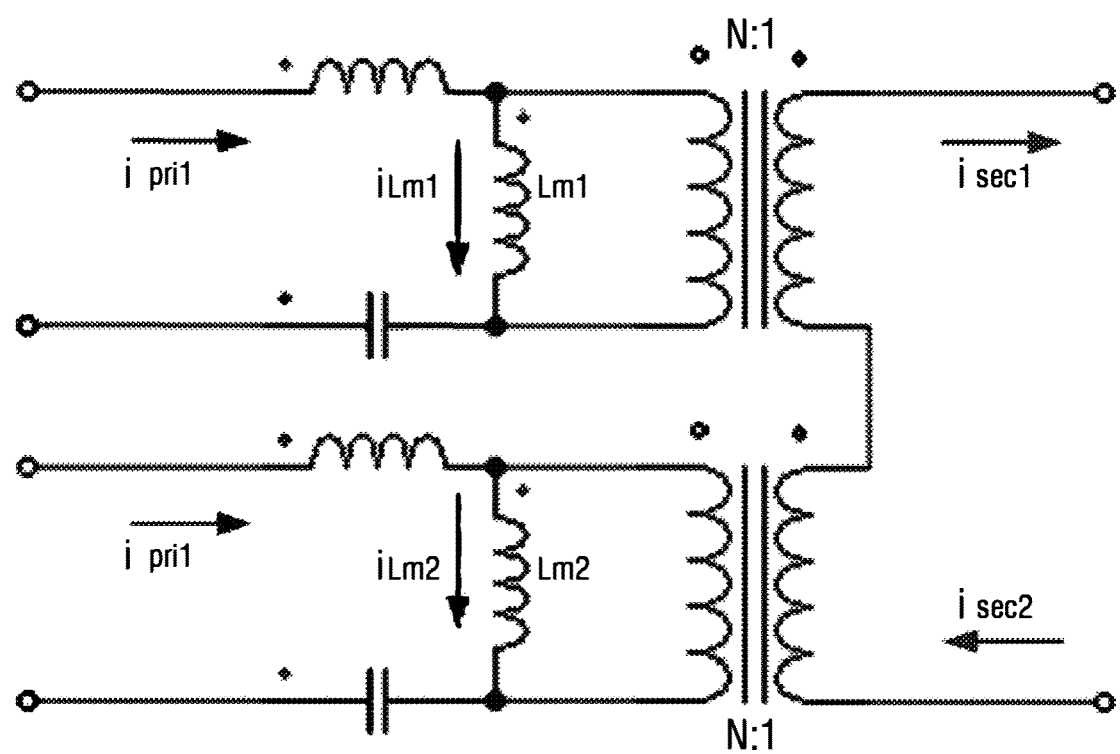
FIG. 11 is a view for describing operations in the power circuit with a plurality of transformers in FIGS. 9 and 10.

FIG. 11 is a view for describing operations in the power circuit with a plurality of transformers in FIGS. 9 and 10.

For convenience of description, the operations of two transformer modules 310 and 320 as shown in FIG. 9 will be described below with reference to FIG. 11 by way of example, but the sample operations may be applied to each of the transformer modules 410, 420, ..., 430 as shown in FIG. 10.

As shown in FIG. 11, the secondary sides of the transformers 313 and 323 are connected to each other in series, and therefore load currents flowing in the secondary sides of the first transformer 313 and the second transformer 323 are equal to each other like the following expression 1.

$$i_{sec1} = i_{sec2} \quad \text{[Expression 1]}$$

Here, when it is assumed that the first and second transformers 313 and 323 have the same magnetized inductance and symmetrical gate signals of 50:50 having a phase difference of 180 degrees are applied both switching devices, i.e. the high-side switch and low-side switch of the switches 312 and 322 corresponding to the first and second transformers 313 and 323, the magnetized currents iLm1 and iLm2 are offset to 0. Further, the switching devices of the modules 310 and 320 have the same operation frequency, and have the same turn ratio of N:1 between the first and second transformers 311 and 321, currents flowing in the magnetized inductors are equal to each other like the following expression 2.

$$i_{Lm1}=i_{Lm2}$$ [Expression 2]

Therefore, currents $i_{pri1}$ and $i_{pri2}$ at the primary sides of the first and second transformers 311 and 321 based on the Expression 1 and the Expression 2 are equal to each other like the following expression 2. Thus, the current balance is naturally kept without any separate configuration for controlling the current in the adapter 210.

$$i_{pri1}(=i_{Lm1}+i_{sec1}/N)=i_{pri2}(=i_{LM2}+i_{sec2}/N)$$ [Expression 3]

As described above, when the secondary sides of the transformers 311 and 321 are connected in series to each other, the current flowing in the first transformer module 310 and the second transformer module 320 is divided exactly in half without separate current control and therefore the modules 310 and 320 are in charge of the output load half and half.

Therefore, the adapter 210 is easily designed without a current controller to a resonance tank circuit for obtaining a voltage gain of the modules 310 and 320}, and show half current stress in devices and a root mean square (RMS) (or an effective value) as compared with a single transformer module, thereby having advantages of high efficiency and miniaturization.

The foregoing principle of the current balance is also equally applied to the transformer modules 410, 420, ..., 430 of the embodiment shown in FIG. 10. In other words, as described in the Expressions 1 to 3, the output currents at the secondary sides of the transformers 413, 423, ..., 433 are the same and thus the output load is equally shared among the transformer modules 410, 420, ..., 430. Therefore, it is easy to deal with increase in the output load in designing the adapter 210 and it advantageous to achieve high efficiency and miniaturization.

On the principle of the current balance, the output currents in the circuit of FIG. 9 are varied depending on the levels of the input voltage, which will be illustrated in FIGS. 12 to 15.

Figure 12:
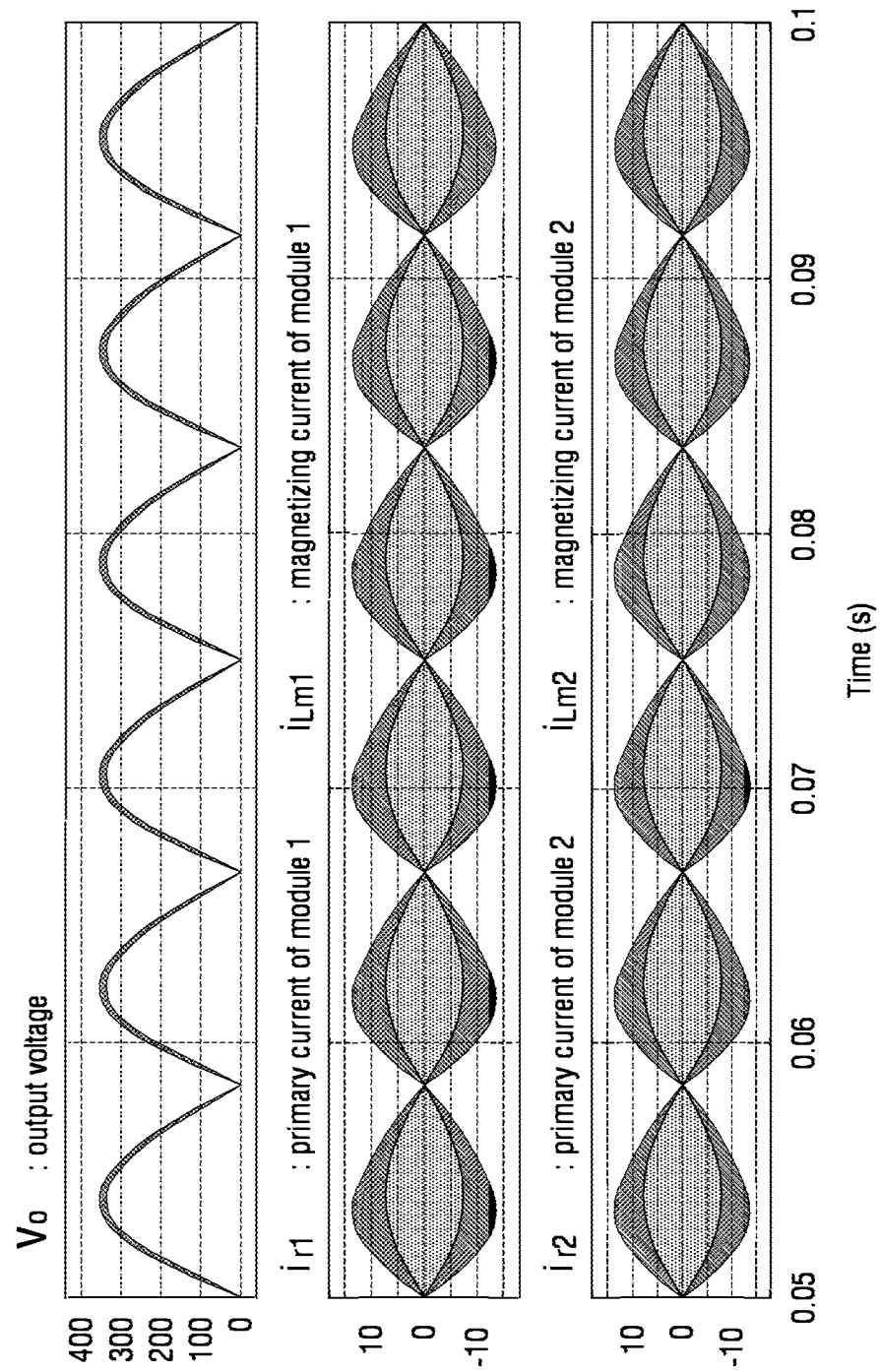
FIG. 12 illustrates current waveforms of a first input AC voltage Vac of 90 Vms.
Figure 13:
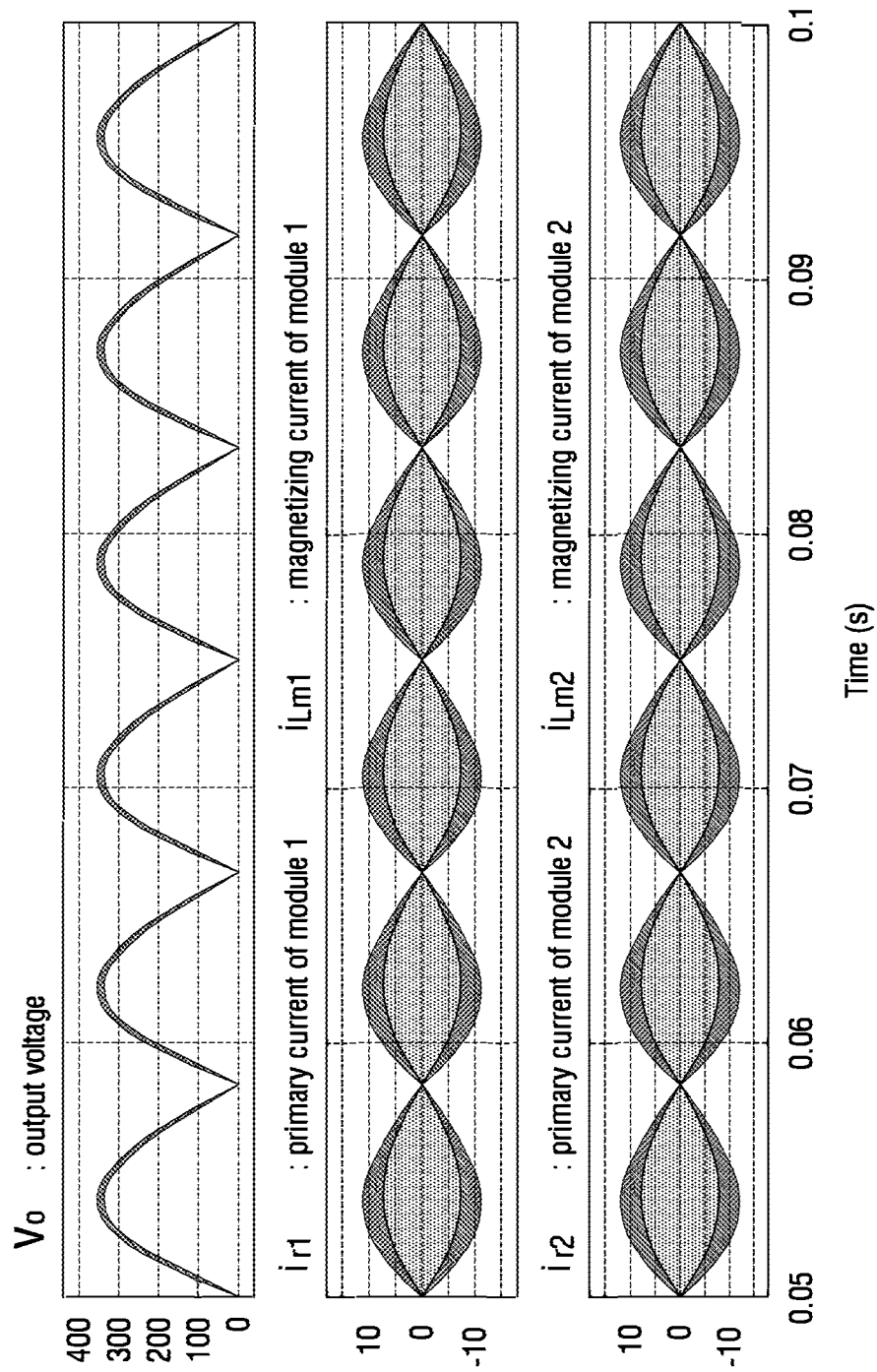
FIG. 13 illustrates current waveforms of a first input AC voltage Vac of 110 Vms.
Figure 14:
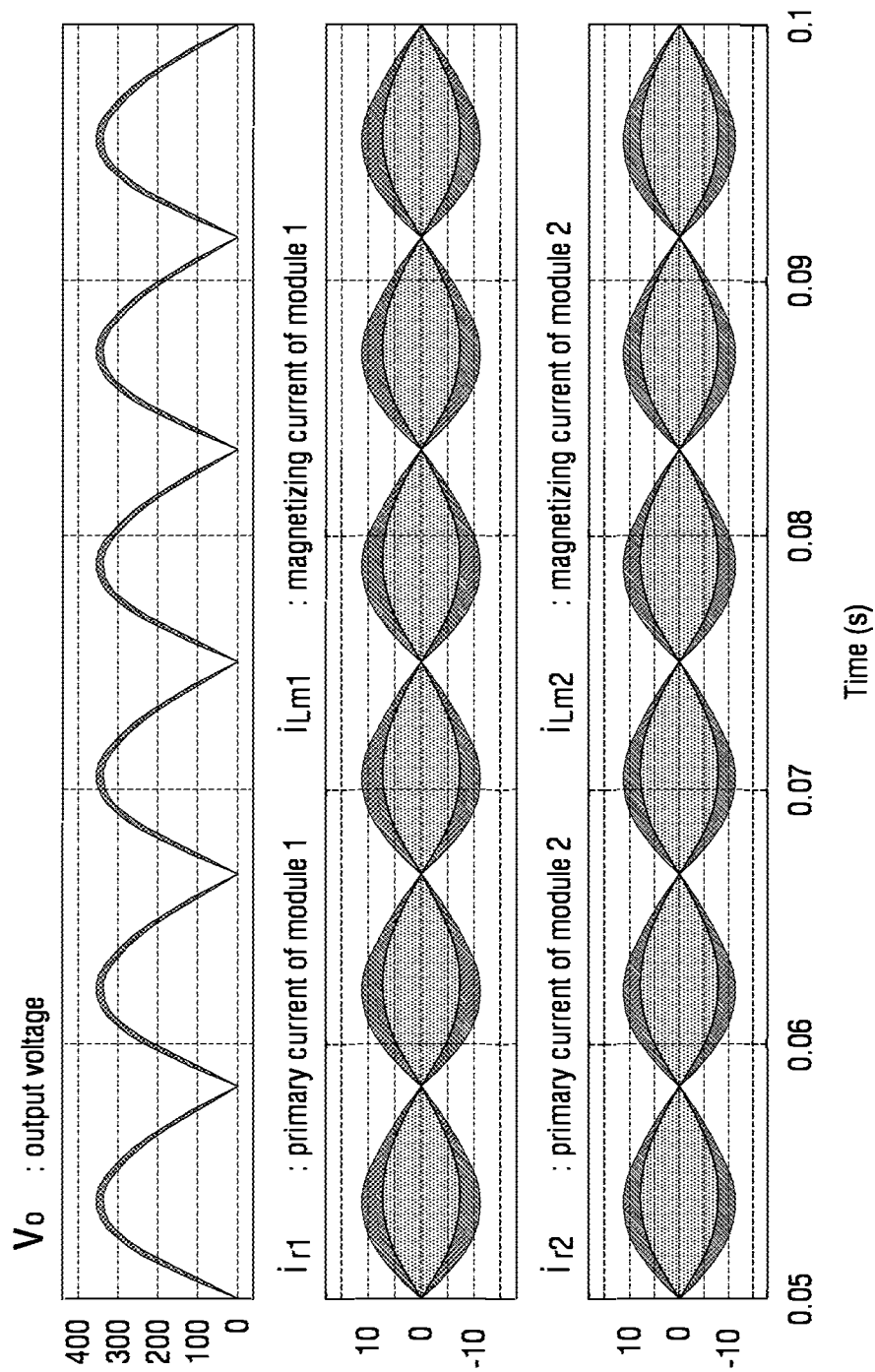
FIG. 14 illustrates current waveforms of a first input AC voltage Vac of 220 Vms.
Figure 15:
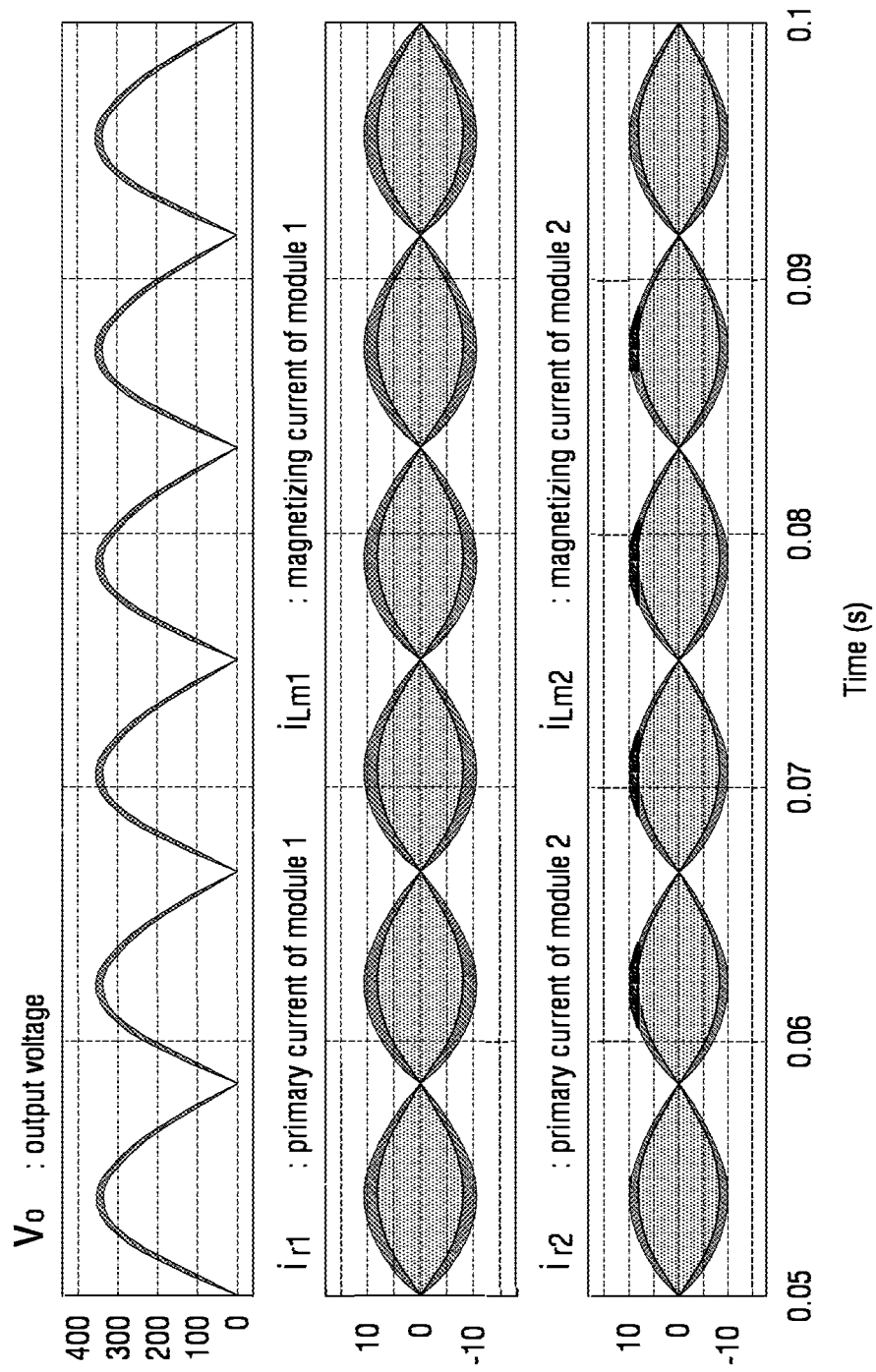
FIG. 15 illustrates current waveforms of a first input AC voltage Vac of 264 Vms.

FIG. 12 illustrates current waveforms of a first input AC voltage Vac of 90 Vms, FIG. 13 illustrates current waveforms of a first input AC voltage Vac of 110 Vms, FIG. 14 illustrates current waveforms of a first input AC voltage Vac of 220 Vms, and FIG. 15 illustrates current waveforms of a first input AC voltage Vac of 264 Vms.

FIGS. 12 to 15 show simulation results according to variation in the input first AC voltage, and their experimental conditions are as follows.

Vac=90~264 Vrms, Po=900 W, Vo=247.5 Vrms, Lr=15 uH, Cr=136 nF, Lm=80 uH, a transformer turn ratio=12:9, Co=2 uF, and Cin=2 uF In the display apparatus 10 according to an embodiment of the disclosure, the adapter 210 with the plurality of transformer modules 310 and 320 as shown in FIG. 9 receives the first AC voltage Vin having various levels as respectively shown in FIGS. 12, 13, 14 and 15 within a range of 90V~264 Vac, and outputs the second AC voltage Vo controlled to have a constant level. Further, the current balance is kept in the transformer modules 310 and 320 of FIGS. 12, 13, 14 and 15.

Meanwhile, in the display apparatus according to an embodiment of the disclosure, various circuit topological transformers, which can generate high frequency pulses through chopping and perform a resonance operation, may be applied to the adapter. For example, the transformer may be embodied in the form of a resonance half-bridge converter or a resonance full-bridge converter, which is an LLC resonant converter having good operation characteristics with respect to variation in a load.

Figure 16:
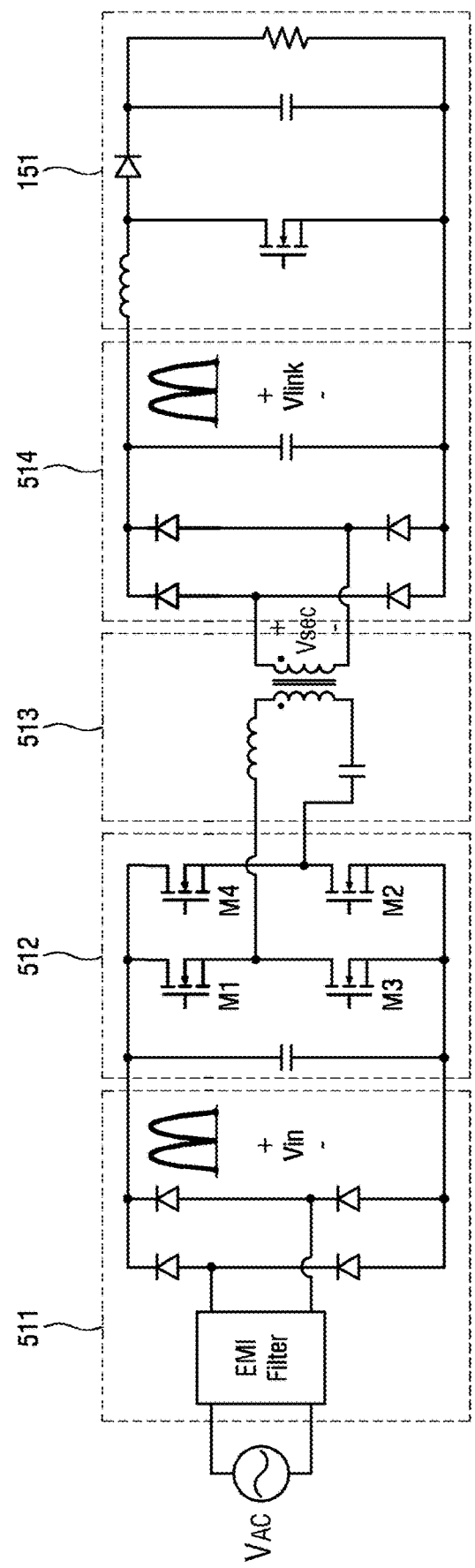
FIG. 16 illustrates an example of a power circuit including a transformer to which an LLC resonant converter is applied in a display apparatus according to an embodiment of the disclosure.

FIG. 16 illustrates an example of a power circuit including a transformer, to which an LLC resonant converter is applied, in a display apparatus according to an embodiment of the disclosure.

According to an embodiment, the power circuit shown in FIG. 16 may be dispersedly provided between the adapter 210 connected to the main body 100 by the cable 111 and outputting the AC voltage and the main body 100.

Specifically, as shown in FIG. 16, the adapter 210 includes a first rectifier 511, a switch 512, a transformer 513, and a second rectifier 514, and a PFC converter 151 receiving an output voltage from the second rectifier 514 may be provided in the main body 100. Here, the switch 512 includes first to fourth switching devices M1, M2, M3 and M4, which are turned on and off to form one of a full-bridge or a half-bridge.

The first rectifier 511, the switch 512, the transformer 513, and the second rectifier 514 of the circuit shown in FIG. 16 are equivalent to the first rectifier 211, the switch 212, the transformer 213 and the second rectifier 214 of the circuit shown in FIG. 5, respectively. Although it is not shown in FIG. 16, a controller 550 (see FIG. 19) for controlling the switch 512 is additionally provided, and is equivalent to the controller 215 of the circuit shown in FIG. 5. Thus, the elements of the same name perform the same operation, and thus repetitive descriptions thereof will be avoided as necessary.

The first rectifier 511 receives the commercial power as a first AC voltage (i.e. an input AC line voltage) through the adapter connector 110. According to the disclosure, the first AC voltage may for example be the universal lines 90~264 Vrms.

According to an embodiment, when the adapter 210 includes an AC/AC converter, in which the switch 512 including the switching devices M1, M2, M3 and M4 performing on/off switching operations and the transformer 513 applying voltage from the primary side to the secondary side based on the switching operation are included as shown in FIG. 16, the adapter 210 is configured to operates in one of the high voltage mode and the low voltage mode according to the level/range of the input voltage, i.e. the first AC voltage.

Figure 17:
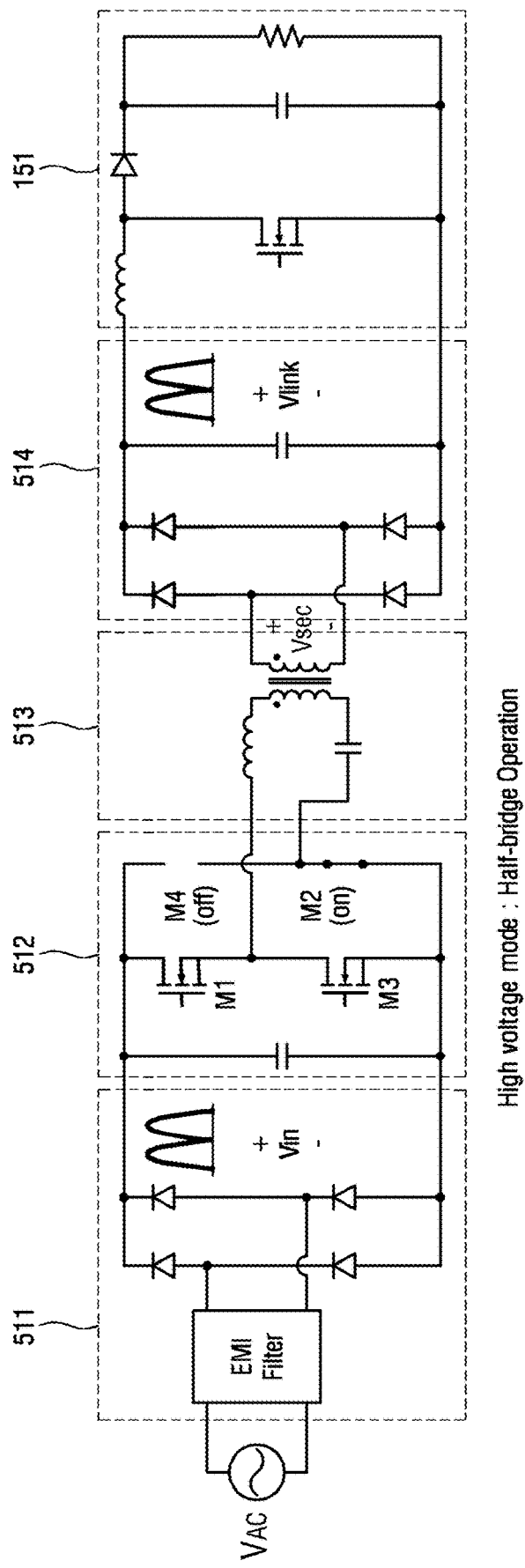
FIG. 17 is a circuit diagram of when the power circuit of FIG. 16 operates in a high voltage mode.
Figure 18:
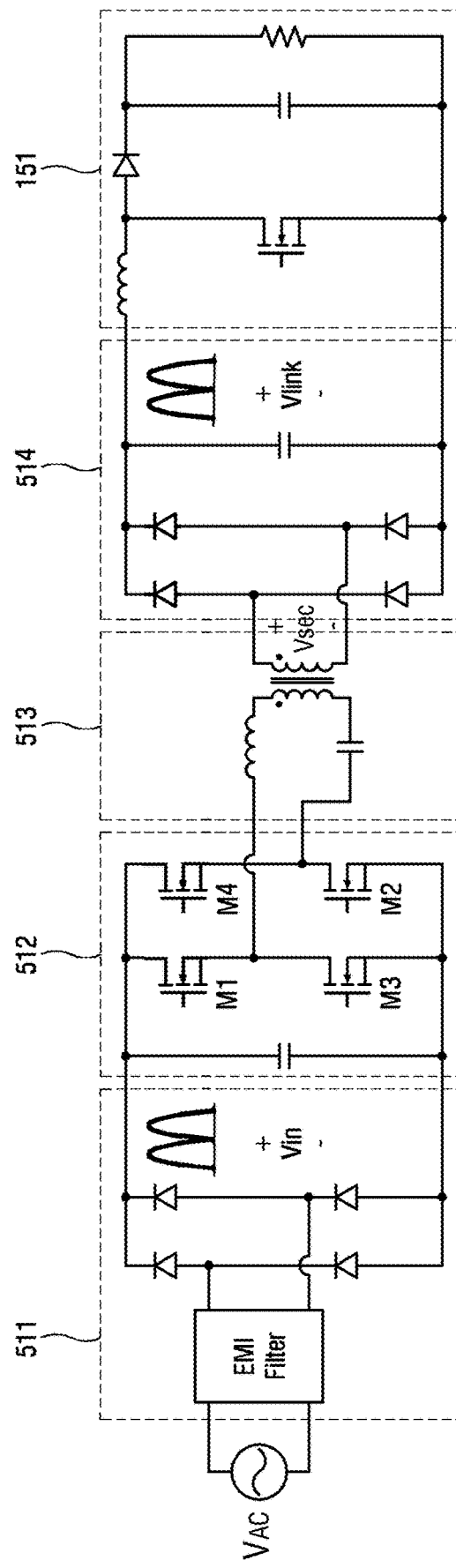
FIG. 18 is a circuit diagram of when the power circuit of FIG. 16 operates in a low voltage mode.

FIG. 17 is a circuit diagram of when the power circuit of FIG. 16 operates in a high voltage mode, and FIG. 18 is a circuit diagram of when the power circuit of FIG. 16 operates in a low voltage mode.

According to an embodiment, the LLC resonant converter with the switch 512 and the transformer 513 may operate in the high voltage mode as shown in FIG. 17 when the input first AC voltage is higher than or equal to a preset first reference voltage, and operate in the low voltage mode as shown in FIG. 18 when the first AC voltage is lower than the preset first reference voltage. Here, the first reference voltage may for example be set to 180 Vrms, but not limited to this example.

In the high voltage mode, the LLC resonant converter may, as shown in FIG. 17, operate as a half-bridge LLC resonant converter by switching the switching devices M1 and M3 at high speed while the switching device M2 is continuously turned on and the switching device M4 is continuously turned off. Here, the switching devices M1 and M3 may, as shown in FIG. 20, operate to be alternately/complementarily switched at their operation frequencies modulated based on a driving signal from a controller 550.

In the low voltage mode, the LLC resonant converter may, as shown in FIG. 18, operate as a full-bridge LLC resonant converter by switching all the switching devices M1, M2, M3 and M4 at high speed, with input/output voltage gains twice as much as those of the half-bridge LLC resonant converter of FIG. 17. Here, the switching devices M1 and M2 are alternately/complementarily switched, and the switching devices M3 and M4 are alternately/complementarily switched. Further, the switching devices M1, M2, M3 and M4 may be switched at their operation frequency or duty modulated based on the driving signal from the controller 515.

According to an embodiment, the full-bridge LLC resonant converter operating in the low voltage mode may operate in a low voltage pulse width modulation (PWM) mode when the input first AC voltage is higher than or equal to a preset second reference voltage, and may operate in a low voltage pulse frequency modulation (PFM) mode when the first AC voltage is lower than the preset second reference voltage. Here, the second reference voltage may for example be set to 132 Vrms, but not limited to this example. In the low voltage PWM mode, the pulse width may for example be controlled by controlling the duty or modulating the phase of the driving signal applied to the switching devices M1, M2, M3 and M4.

Figure 19:
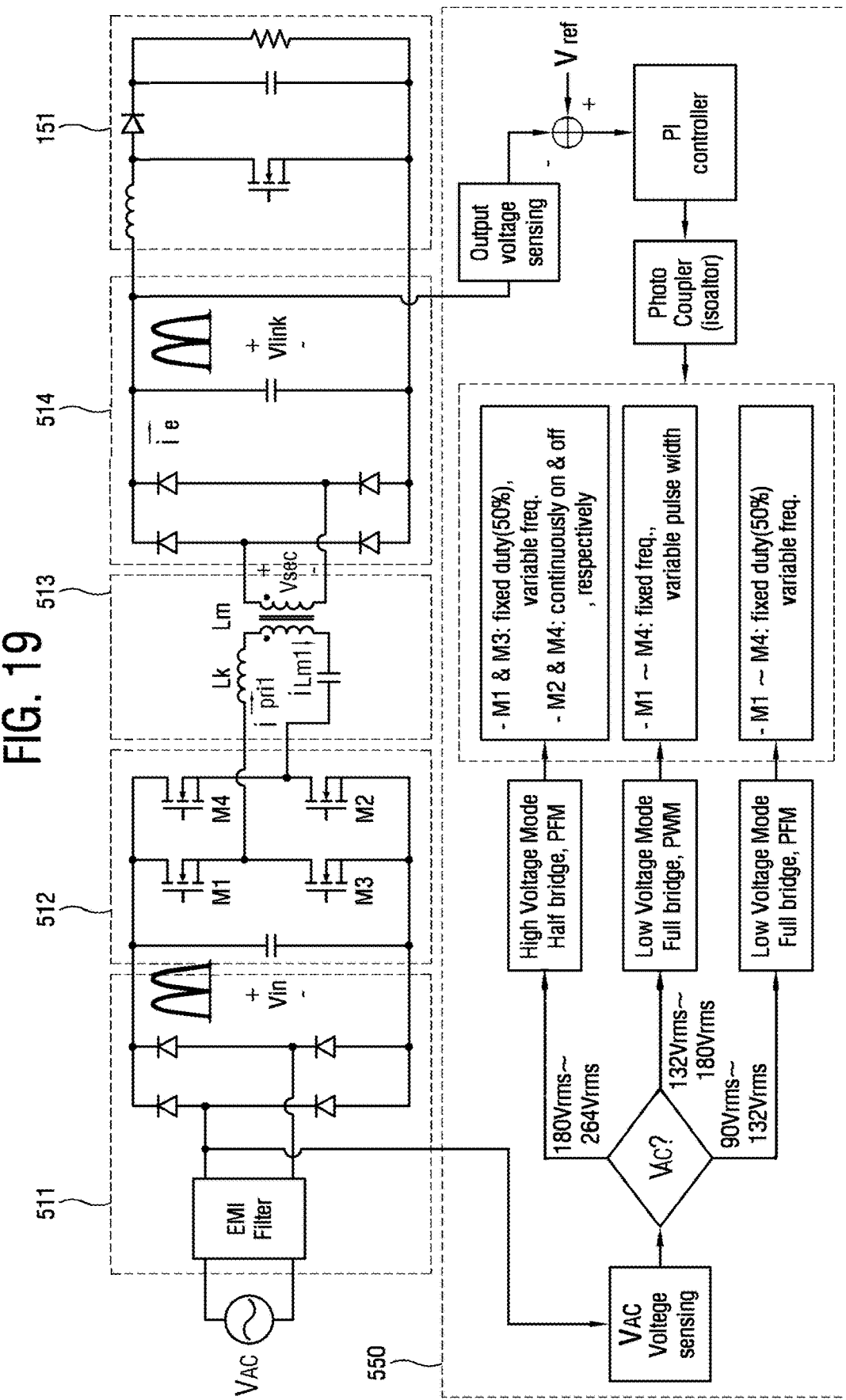
FIG. 19 is a view for describing operation modes according to ranges of an input voltage in the power circuit of FIG. 16.
Figure 20:
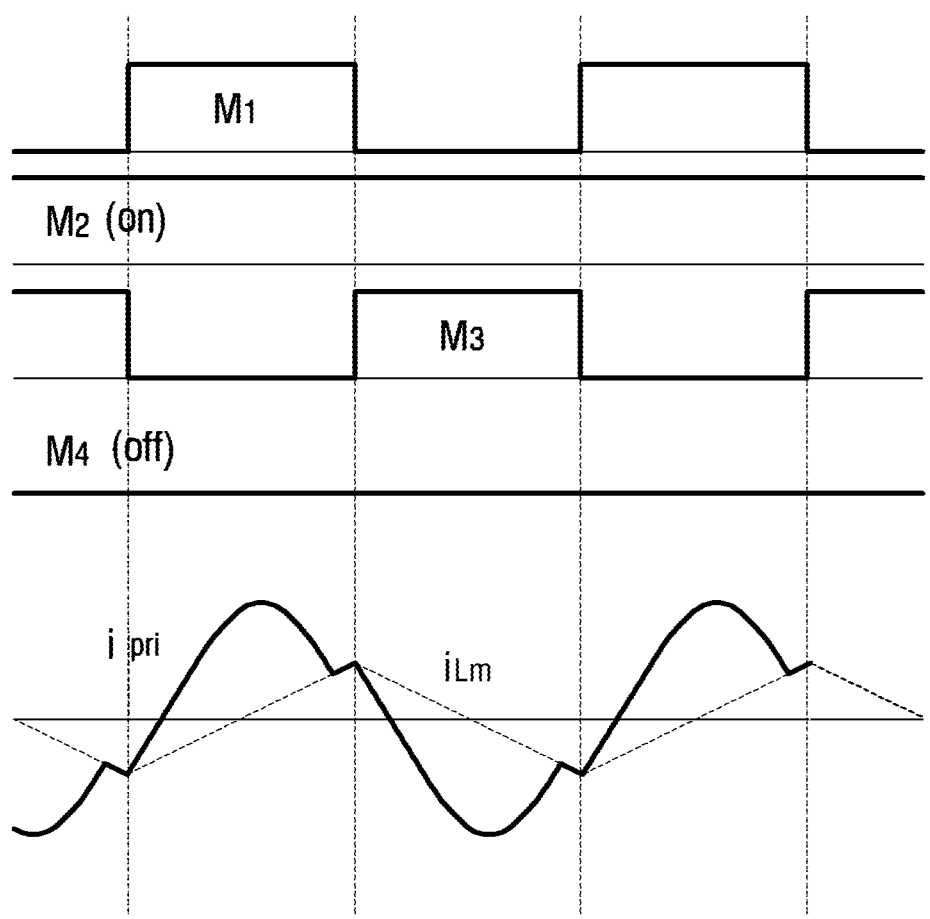
FIG. 20 illustrates waveforms based on operations of a power circuit in a high voltage mode.
Figure 21:
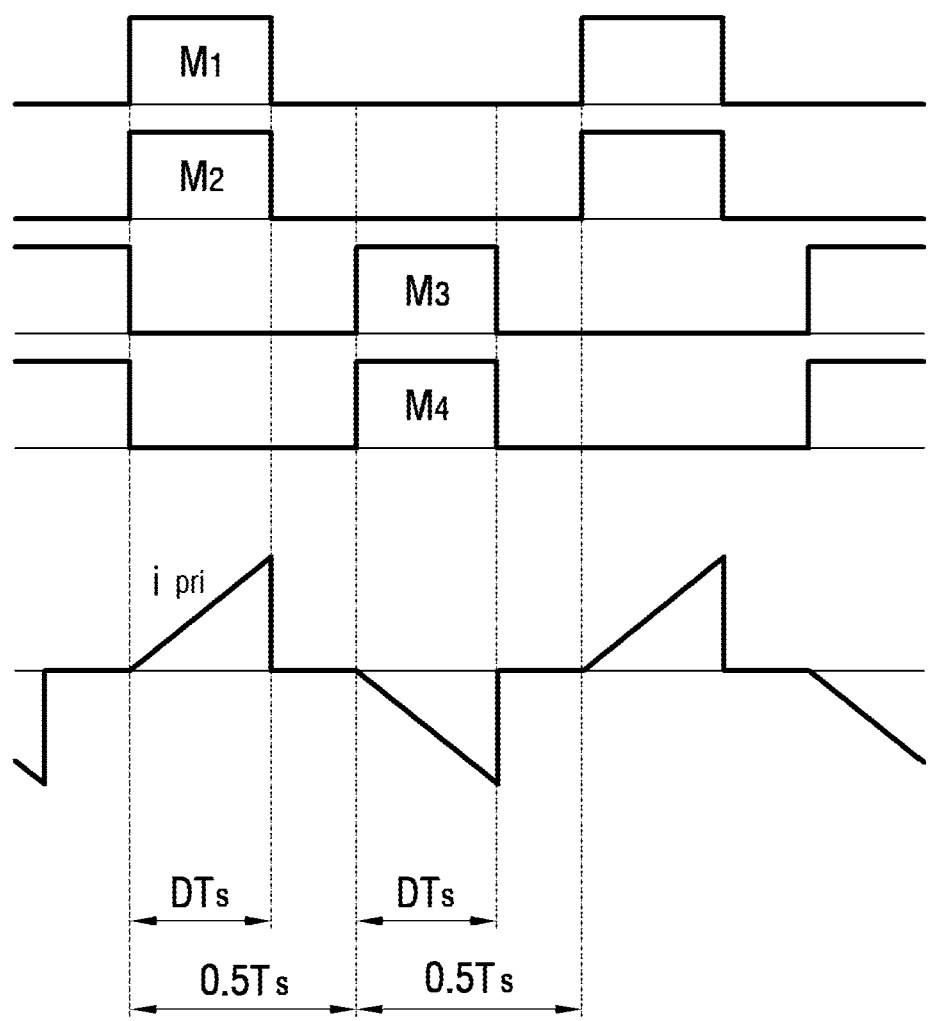
FIG. 21 illustrates waveforms of when a power circuit performs a duty-control operation in a low voltage pulse width modulation (PWM) mode.
Figure 22:
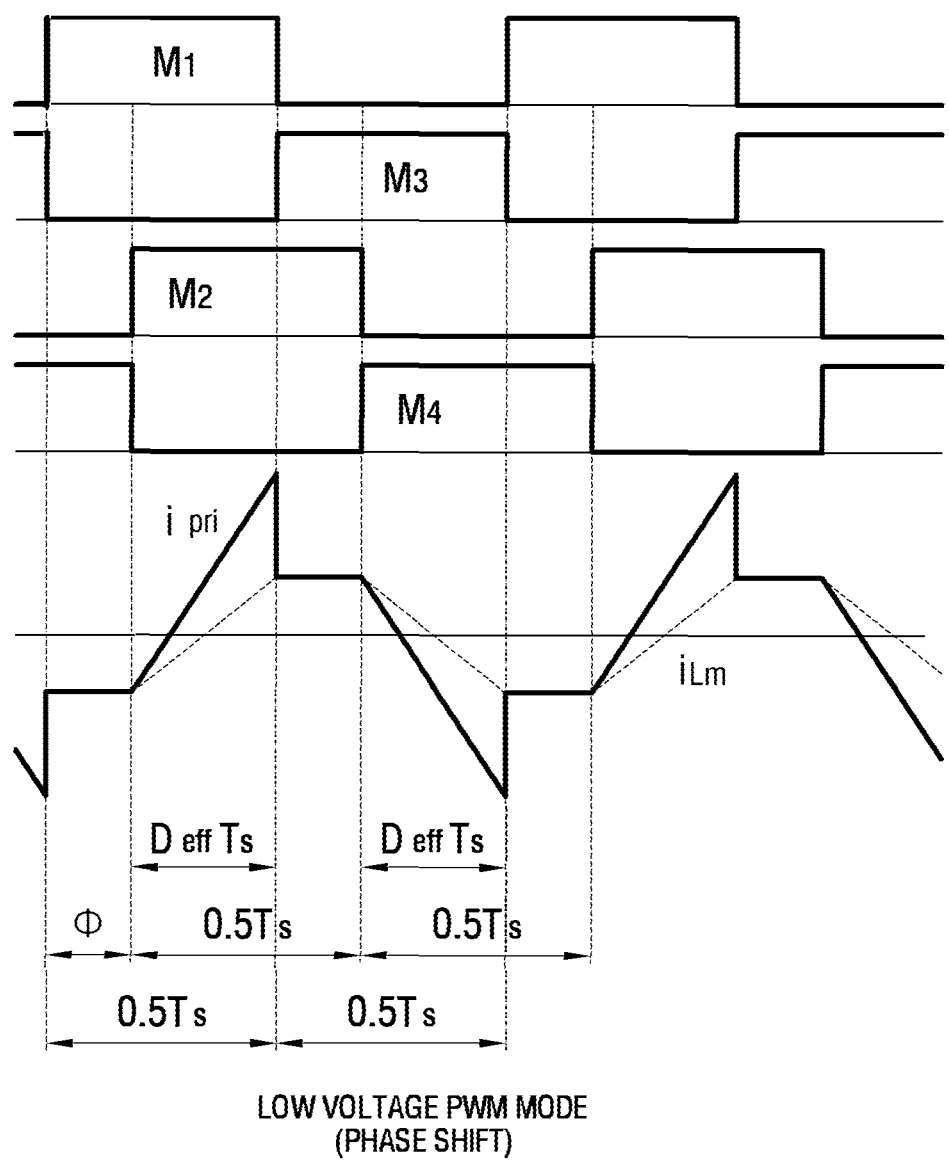
FIG. 22 illustrates waveforms of when a power circuit performs a phase-shift operation in a low voltage PWM mode.
Figure 23:
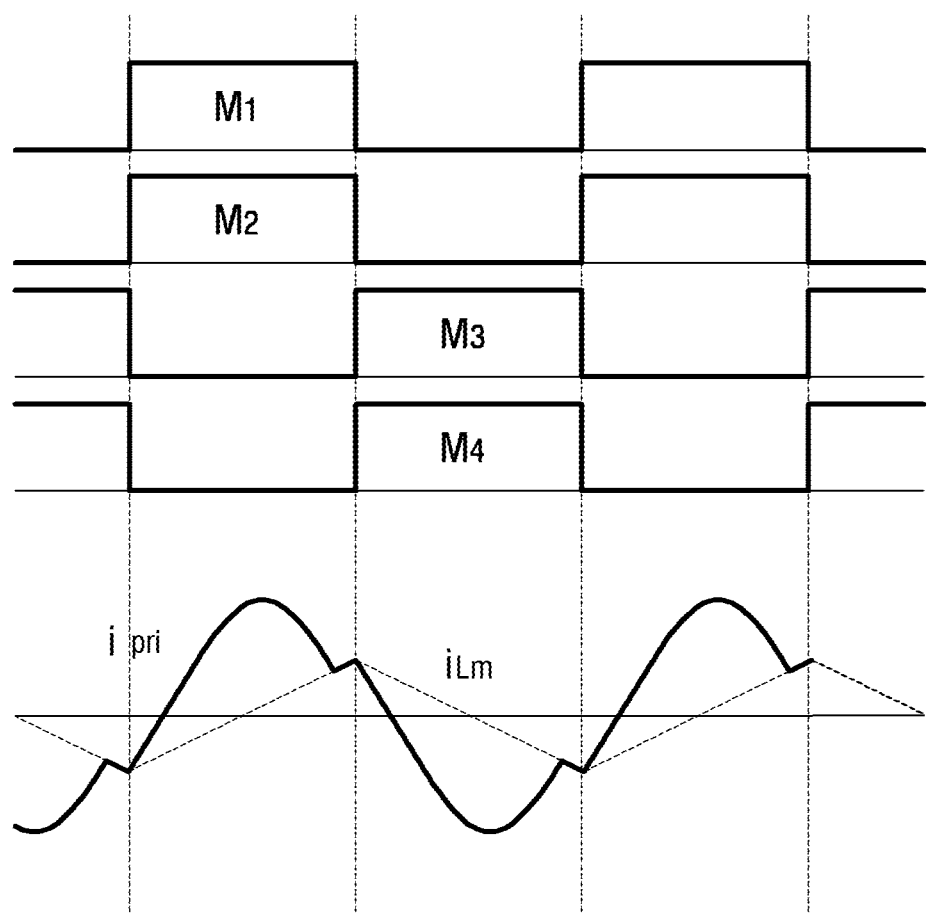
FIG. 23 illustrates waveforms based on operations of a power circuit in a low voltage pulse frequency modulation (PFM) mode.
Figure 24:
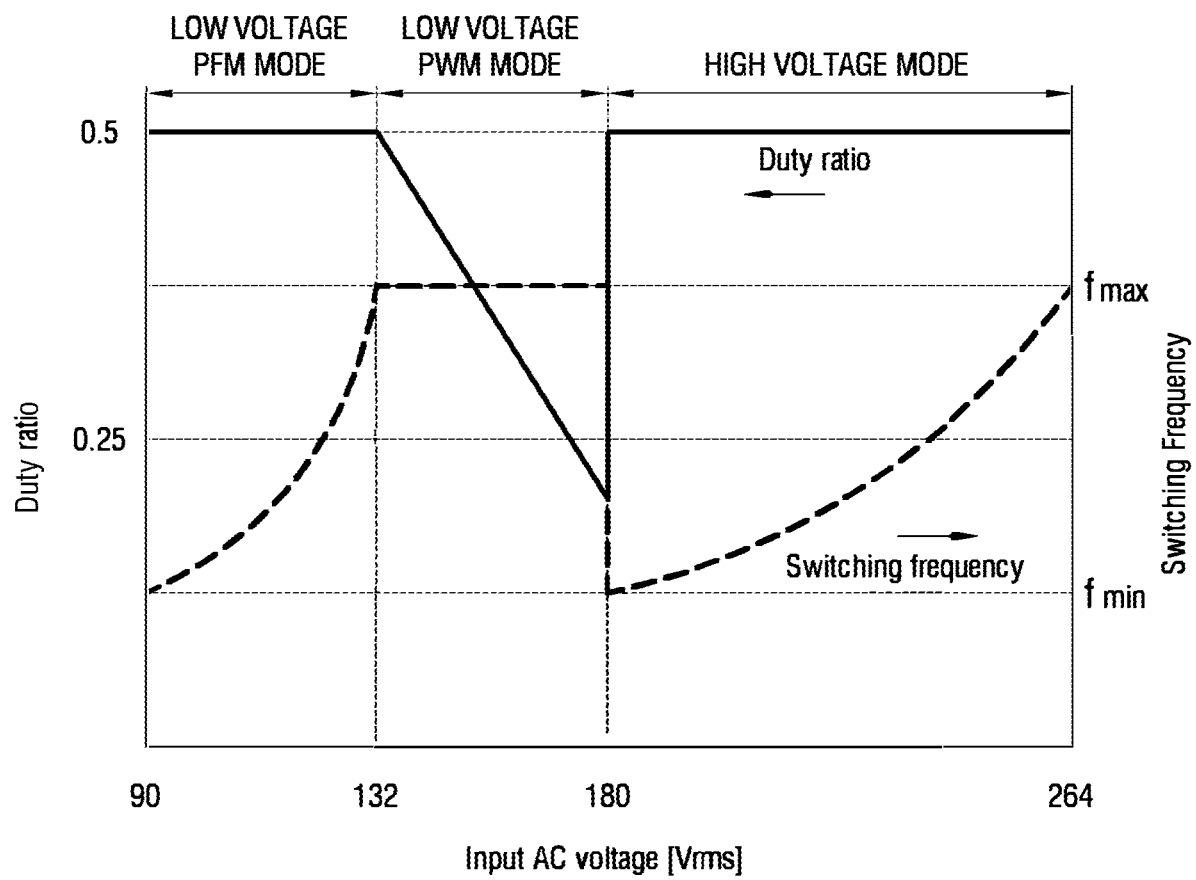
FIG. 24 illustrates waveforms of operation modes according to ranges of an input voltage.

FIG. 19 is a view for describing operation modes according to ranges of an input voltage in the power circuit of FIG. 16, FIG. 20 illustrates waveforms based on operations of a power circuit in a high voltage mode, FIG. 21 illustrates waveforms of when a power circuit performs a duty-control operation in a low voltage PWM mode, FIG. 22 illustrates waveforms of when a power circuit performs a phase-shift operation in a low voltage PWM mode, FIG. 23 illustrates waveforms based on operations of a power circuit in a low voltage FM mode, and FIG. 24 illustrates waveforms of operation modes according to ranges of an input voltage.

As shown in FIG. 16, the adapter 210 including the LLC resonant converter, which can be switched over between the half-bridge mode and the full-bridge mode as the switching devices M1, M2, M3 and M4 are selectively turned on/off, receives an input voltage, i.e. the first AC voltage VAC within a predetermined range, e.g. 90~264 Vrms.

The controller 550 detects the level of the input first AC voltage VAC, and controls the switching devices M1, M2, M3 and M4 to be selectively turned on/off and the switching operations based on the detection results, thereby controlling the LLC resonant converter to operate in the mode corresponding to the input voltage.

Specifically, when the level of the input first AC voltage VAC is within a range of 180~264 Vrms as shown in FIGS. 19 and 24, the controller 550 turns on and off the switching devices M2 and M4, respectively, as shown in FIG. 20, and performs switching at high speed by varying, i.e. modulating the frequency of the driving signal, i.e. a switch gate signal applied to the switching devices M1 and M3 as shown in FIG. 24, thereby controlling the second AC voltage boosted by the transformer 513 to be output. Here, the driving signal applied to the switching devices M1 and M3 performing the switching has a fixed duty of 50% as shown in FIG. 24. Therefore, the LLC resonant converter operates in the high voltage mode (High voltage & PFM Modes).

Further, when the level of the input first AC voltage VAC is within a range of 132-180 Vrms as shown in FIGS. 19 and 24, the controller 550 performs switching at high speed by varying, i.e. shifting the duty or phase of the driving signal, i.e. the switch gate signal applied to the switching devices M1, M2, M3 and M4 as shown in FIGS. 21 and 22, thereby controlling the second AC voltage boosted by the transformer 513 to be output. Here, the driving signal applied to the switching devices M1, M2, M3 and M4 performing the switching has a fixed frequency as shown in FIG. 24. Therefore, the LLC resonant converter operates in the low voltage PWM mode.

According to an embodiment, the higher the output voltage the lower the duty in the duty-control low voltage PWM mode in which the operation duty is variable as shown in FIG. 20. According to an alternative embodiment, the higher the output voltage the lower the effective duty Deff with the increasing phase in the phase-shift low voltage PWM mode in which the phase is varied as shown in FIG. 21. In these embodiment, zero voltage switching is secured throughout the whole input range and the whole load range Further, when the level of the input first AC voltage VAC is within a range of 90~132 Vrms as shown in FIGS. 19 and 24, the controller 550 performs switching at high speed by varying, i.e. modulating the operation frequency of the driving signal applied to the switching devices M1, M2, M3 and M4 as shown in FIGS. 23 and 24, thereby controlling the second AC voltage boosted by the transformer 513 to be output. Here, the driving signal applied to the switching devices M1, M2, M3 and M4 performing the switching has a fixed duty of 50% as shown in FIG. 23. Therefore, the LLC resonant converter operates in the low voltage PFM mode.

As described above, the controller 550 may for example get, i.e. detect a feedback of the second AC voltage rectified as the output voltage by the method described with reference to FIG. 7, and control the second AC voltage to be output at a constant level based on the detection result, while performing control to operate in the mode corresponding to the level/range of the input first DC voltage.

Therefore, it is possible not only to operate in the modes corresponding to input AC power of various levels but also control the output voltage to be kept at a constant level, thereby being efficiently usable in various regions/countries different in supplied voltage.

As described above, a display apparatus according to the disclosure can stably receive power through a miniaturized and lightweight adapter of which an input and an output can be electrically insulated.

Further, the disclosure provides a power circuit that has a simple structure in which a modularized AC/AC converter including a high frequency transformer is easily extensible corresponding to loads and a current balance of each module is secured.

Further, the disclosure can be efficiently used in various regions/countries by not only operating with input AC power of various levels but also controlling an output voltage to be kept at a constant level.

Although a few exemplary embodiments have been shown and described, it will be appreciated that changes may be made in these exemplary embodiments without departing from the scope defined in the appended claims.

What is claimed is:

1. A display apparatus comprising:
   a main body including a display and a connector; and
   an adapter connectable to the main body and configured to supply power to the main body while the main body is connected to the adapter via the connector, the adapter comprising:
   a transformer configured to boost a first alternating current (AC) voltage that is input, a switch comprising a switching device configured to switch a current flowing in the transformer, a controller configured to control the switching device to output a second AC voltage boosted by the transformer, a first rectifier configured to rectify the input first AC voltage, a second rectifier configured to rectify the boosted second AC voltage, and wherein the controller detects the rectified second AC voltage, and controls the second AC voltage to be constant based on a result of the rectified second AC voltage detected.

2. The display apparatus according to claim 1, wherein the transformer is among a plurality of transformers, and the plurality of transformers comprise primary sides to which the first AC voltage is input in parallel and secondary sides connected in series to each other.

3. The display apparatus according to claim 2, wherein the switch is among a plurality of switches corresponding to the plurality of transformers, and the controller outputs one driving signal to the plurality of switches.

4. The display apparatus according to claim 1, wherein the controller detects an average voltage or a peak voltage of the second AC voltage, and controls the average voltage or the peak voltage of the second AC voltage to be constant based on a result of the average voltage or the peak voltage of the second AC voltage detected.

5. The display apparatus according to claim 1, wherein the controller controls a frequency or duty of a driving signal applied to the switch based on the result of the rectified second AC voltage detected.

6. The display apparatus according to claim 1, wherein the transformer comprises an LLC resonant converter.

7. The display apparatus according to claim 6, wherein the switch comprises a first switching device, a second switching device, a third switching device and a fourth switching device, and is switched over between a full-bridge mode or a half-bridge mode as the first switching device, the second switching device, the third switching device and the fourth switching device are selectively turned on or off.

8. The display apparatus according to claim 7, wherein the controller controls the second switching device to be turned on, the fourth switching device to be turned off, and the first switching device and the third switching device to be complementarily switched, based on the input first AC voltage higher than or equal to a reference voltage.

9. The display apparatus according to claim 8, wherein the controller controls a driving signal applied to the first switching device and the third switching device to be varied in frequency.

10. The display apparatus according to claim 7, wherein the controller controls the first switching device and the second switching device to be complementarily switched, and the third switching device and the fourth switching device to be complementarily switched, based on the input first AC voltage lower than a reference voltage.

11. The display apparatus according to claim 10, wherein the reference voltage is a first reference voltage, and the controller controls a driving signal applied to the first switching device, the second switching device, the third switching device and the fourth switching device to be varied in duty, based on the input first AC voltage higher than or equal to a second reference voltage.

12. The display apparatus according to claim 10, wherein the reference voltage is a first reference voltage, and the controller controls a driving signal applied to the first switching device, the second switching device, the third switching device and the fourth switching device to be varied in phase, based on the input first AC voltage higher than or equal to a second reference voltage.

13. The display apparatus according to claim 7, wherein the controller controls a driving signal applied to the first switching device, the second switching device, the third switching device and the fourth switching device that is varied in frequency, based on the input first AC voltage lower than a reference voltage.

14. An electronic apparatus comprising:

a connector connectable to a main body including a display; and an adapter configured to supply power to the main body while the main body is connected to the adapter via the connector and the adapter comprising:

a transformer configured to boost a first alternating current (AC) voltage that is input, a switch comprising a switching device configured to switch a current flowing in the transformer, a controller configured to control the switching device to output a second AC voltage boosted by the transformer, and a first rectifier configured to rectify the input first AC voltage, a second rectifier configured to rectify the boosted second AC voltage, wherein the second AC voltage output from the adapter is subjected to power factor correction (PFC) and converted into a direct current (DC) voltage in the main body, and the controller detects the rectified second AC voltage, and controls the second AC voltage to be constant based on a result of the rectified second AC voltage detected.

15. The electronic apparatus according to claim 14, wherein the transformer is among a plurality of transformers, and the plurality of transformers comprise primary sides to which the first AC voltage is input in parallel and secondary sides connected in series to each other.

16. The electronic apparatus according to claim 15, wherein the switch is among a plurality of switches corresponding to the plurality of transformers, and the controller outputs one driving signal to the plurality of switches.

17. The electronic apparatus according to claim 14, wherein the controller detects an average voltage or a peak voltage of the second AC voltage, and controls the average voltage or the peak voltage of the second AC voltage to be constant based on a result of the average voltage or the peak voltage of the second AC voltage detected.

18. The electronic apparatus according to claim 14, wherein the controller controls a frequency or duty of a driving signal applied to the switch based on the result of the rectified second AC voltage detected.

* * * * *